(12) United States Patent
Kim et al.

(10) Patent No.: US 12,177,629 B2
(45) Date of Patent: Dec. 24, 2024

(54) SOUND GENERATION APPARATUS

(71) Applicant: LG Display Co., Ltd., Seoul (KR)

(72) Inventors: Taehyung Kim, Paju-si (KR); GyungBo Ha, Paju-si (KR); SeulKi Nam, Paju-si (KR); Minjung Kim, Paju-si (KR); MinHo Sohn, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 209 days.

(21) Appl. No.: 18/088,326

(22) Filed: Dec. 23, 2022

(65) Prior Publication Data
US 2023/0217188 A1    Jul. 6, 2023

(30) Foreign Application Priority Data

Dec. 31, 2021    (KR) .................. 10-2021-0194788

(51) Int. Cl.
| | |
|---|---|
| *H04R 17/00* | (2006.01) |
| *B62D 21/02* | (2006.01) |
| *B62D 21/15* | (2006.01) |
| *B62D 25/08* | (2006.01) |
| *B62D 27/02* | (2006.01) |
| *G10K 11/16* | (2006.01) |
| *H04R 3/00* | (2006.01) |

(52) U.S. Cl.
CPC ............ *H04R 17/00* (2013.01); *B62D 21/02* (2013.01); *B62D 21/155* (2013.01); *B62D 25/08* (2013.01); *B62D 27/023* (2013.01); *G10K 11/16* (2013.01); *H04R 3/00* (2013.01); *H04R 2499/15* (2013.01)

(58) Field of Classification Search
CPC ...... H04R 17/00; H04R 3/00; H04R 2499/15; B62D 21/02; B62D 21/155; B62D 25/08; B62D 27/023; G10K 11/16
USPC .......................................... 381/94.1
See application file for complete search history.

(56) References Cited

U.S. PATENT DOCUMENTS

| | | | | |
|---|---|---|---|---|
| 8,837,763 | B1 * | 9/2014 | Millen ................ | H04R 1/2834 |
| | | | | 381/345 |
| 2019/0394600 | A1 | 12/2019 | Seldess | |

(Continued)

FOREIGN PATENT DOCUMENTS

| | | |
|---|---|---|
| EP | 3890351 A1 | 10/2021 |
| EP | 3962107 A2 | 3/2022 |

(Continued)

OTHER PUBLICATIONS

Search and Examination Report issued Feb. 19, 2024 for United Kingdom Divisional Patent Application No. GB2401418.5.

(Continued)

*Primary Examiner* — Sean H Nguyen
(74) *Attorney, Agent, or Firm* — Morgan, Lewis & Bockius LLP

(57) ABSTRACT

An apparatus may include a passive vibration member and an active vibration member connected to the passive vibration member and including first and second vibration portions arranged in parallel with each other. The apparatus may further include a driving apparatus configured to apply a first driving signal to the first vibration portion and a second driving signal to the second vibration portion, based on an input signal, to vibrate the first vibration portion and the second vibration portion.

20 Claims, 7 Drawing Sheets

(56) References Cited

U.S. PATENT DOCUMENTS

| | | |
|---|---|---|
| 2020/0288246 A1 | 9/2020 | Polleros et al. |
| 2021/0306741 A1 | 9/2021 | Kim et al. |
| 2022/0069194 A1 | 3/2022 | Lee et al. |
| 2022/0070563 A1 | 3/2022 | Kim et al. |
| 2022/0124439 A1 | 4/2022 | Han et al. |

FOREIGN PATENT DOCUMENTS

| | | | |
|---|---|---|---|
| EP | 3962108 A1 | 3/2022 | |
| EP | 3989603 A1 | 4/2022 | |
| WO | WO-2015187714 A1 * | 12/2015 | ............... H04R 1/26 |

OTHER PUBLICATIONS

Search Report dated Jun. 15, 2023, issued in corresponding UK Patent Application No. GB2219231.4.

* cited by examiner

SOUND GENERATION APPARATUS

CROSS-REFERENCE TO RELATED APPLICATIONS

This application claims the benefit of the Korean Patent Application No. 10-2021-0194788 filed on Dec. 31, 2021, which is hereby incorporated by reference as if fully set forth herein.

BACKGROUND

Technical Field

The present disclosure relates to an apparatus for outputting a sound.

Discussion of the Related Art

Apparatuses for outputting sound include a separate speaker or a sound apparatus for providing a sound. Where a speaker is in a display apparatus, the speaker occupies a space in the display apparatus. Accordingly, the design and spatial disposition of the display apparatus may be limited.

A speaker applied to the apparatus may be, for example, an actuator, including a magnet and a coil. However, if the actuator is applied to the apparatus, a thickness of the apparatus may increase. Thus, piezoelectric elements that enable the apparatus to retain a relatively thin profile are attracting much attention.

Because the piezoelectric elements are relatively fragile, the piezoelectric elements may be easily damaged by an external impact. Thus, the reliability of sound reproduction may be relatively low. Moreover, if a speaker implementing a piezoelectric element is applied to a flexible apparatus, there is a potential problem in that damage may occur due to its relatively fragile characteristic.

SUMMARY

The inventors of the present disclosure have recognized problems described above and have performed various experiments for implementing an apparatus for enhancing the quality of a sound and a sound pressure level characteristic. Therefore, through the various experiments, the inventors of the present disclosure have invented an apparatus having a new structure, which includes an apparatus for enhancing the quality of a sound and a sound pressure level characteristic.

Accordingly, embodiments of the present disclosure are directed to an apparatus that substantially obviates one or more problems due to the limitations and disadvantages of the related art.

An aspect of the present disclosure is directed to providing an apparatus which may enhance a sound pressure level of a low-pitched sound band.

Additional features and aspects of the disclosure will be set forth in the description that follows, and in part will become apparent from the description or may be learned by practice of the inventive concepts provided herein. Other features and aspects of the inventive concepts may be realized and attained by the structure particularly pointed out in, or derivable from, the present disclosure, the claims hereof, and the appended drawings.

To achieve these and other features and aspects of the inventive concepts, as embodied and broadly described herein, an apparatus may include: a passive vibration member; an active vibration member connected to the passive vibration member and including first and second vibration portions arranged in parallel with each other; and a driving apparatus configured to apply a first driving signal to the first vibration portion and a second driving signal to the second vibration portion, based on an input signal, to vibrate the first vibration portion and the second vibration portion. The driving apparatus may include: a signal separation circuit configured to separate the input signal into a low-pitched sound band signal and a high-pitched sound band signal; a filter circuit configured to output first and second high-pitched sound band signals based on the high-pitched sound band signal and to output first and second low-pitched sound band signals based on the low-pitched sound band signal; a correction circuit configured to correct a sound quality of each of the first and the second high-pitched sound band signals and the first and the second low-pitched sound band signals to output a first high-pitched sound band correction signal, a second high-pitched sound band correction signal, a first low-pitched sound band correction signal, and a second low-pitched sound band correction signal; a mixing circuit configured to mix the first high-pitched sound band correction signal with the first low-pitched sound band correction signal to generate a first mixing signal and is configured to mix the second high-pitched sound band correction signal with the second low-pitched sound band correction signal to generate a second mixing signal; and a driving signal generator configured to output the first driving signal based on the first mixing signal and configured to output the second driving signal based on the second mixing signal.

In another aspect, the apparatus may further include a second active vibration member including third and fourth vibration portions arranged in parallel to each other. The first active vibration member may be connected to a first surface of the passive vibration member, and the second active vibration member may be connected to a second surface of the passive vibration member opposite the first surface to overlap at least a portion of the first active vibration member. The filter circuit may be further configured to output third and fourth high-pitched sound band signals based on the high-pitched sound band signal and to output third and fourth low-pitched sound band signals based on the low-pitched sound band signal. The correction circuit may be further configured to correct a sound quality of each of the third and the fourth high-pitched sound band signals and the third and the fourth low-pitched sound band signals to output third and fourth high-pitched sound band correction signals and third and fourth low-pitched sound band correction signals. The mixing circuit may be further configured to mix the third high-pitched sound band correction signal with the third low-pitched sound band correction signal to generate a third mixing signal and is further configured to mix the fourth high-pitched sound band correction signal with the fourth low-pitched sound band correction signal to generate a fourth mixing signal. The driving signal generator may be further configured to output the third driving signal to the third vibration portion based on the third mixing signal and to output the fourth driving signal to the fourth vibration portion based on the fourth mixing signal.

Specific details according to various examples of the present disclosure other than the means for solving the above-mentioned problems are included in the description and drawings below.

According to example embodiments of the present disclosure, an apparatus having an enhanced sound pressure level characteristic of the low-pitched sound band is provided.

Other systems, methods, features and advantages will be, or will become, apparent to one with skill in the art upon examination of the following figures and detailed description. It is intended that all such additional systems, methods, features, and advantages be included within this description and be within the scope of the present disclosure. Nothing in this section should be taken as a limitation on those claims. Further aspects and advantages of the present disclosure are discussed below in conjunction with example embodiments of the disclosure.

It is to be understood that both the foregoing general description and the following detailed description of the present disclosure are by way of example and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure.

Figure 1:
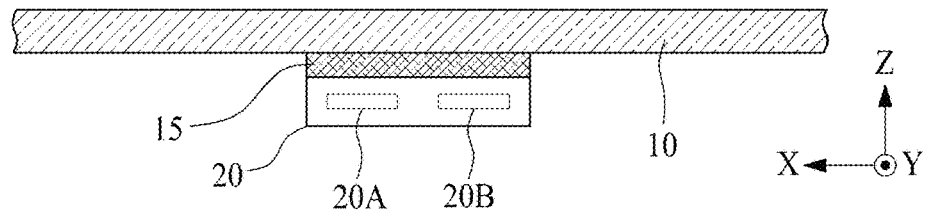
FIG. 1 is a view schematically illustrating an apparatus according to an example embodiment of the present disclosure.

Throughout the drawings and the detailed description, unless otherwise described, the same drawing reference numerals should be understood to refer to the same elements, features, or structures. The relative size and depiction of these elements may be exaggerated for clarity, illustration, or convenience.

DETAILED DESCRIPTION

Reference will now be made in detail to embodiments of the present disclosure, examples of which may be illustrated in the accompanying drawings. In the following description, where the detailed description of the relevant known function or configuration may unnecessarily obscure a feature or aspect of the present disclosure, a detailed description of such known function of configuration may be omitted. The progression of processing steps and/or operations described is an example, and the sequence of steps and/or operations is not limited to that set forth herein and may be modified as is known in the art, with the exception of steps and/or operations necessarily occurring in a particular order. Names of the respective elements used in the following explanations are selected only for convenience of writing the specification and may thus be different from those used in actual products.

Advantages and features of the present disclosure, and implementation methods thereof will be clarified through following example embodiments described with reference to the accompanying drawings. The present disclosure may, however, be embodied in different forms and should not be construed as limited to the example embodiments set forth herein. Rather, these example embodiments are provided so that this disclosure may be sufficiently thorough and complete to assist those skilled in the art to fully understand the scope of the present disclosure. Further, the protected scope of the present disclosure is defined by claims and their equivalents.

The shapes, dimensions, ratios, angles, numbers, and the like, which are illustrated in the drawings to describe various example embodiments of the present disclosure, are merely given by way of example. Therefore, the present disclosure is not limited to the illustrations in the drawings. Like reference numerals generally denote like elements throughout the specification, unless otherwise specified.

Where the terms "comprise," "have," "include," and the like are used, one or more other elements may be added unless the term, such as "only," is used. An element described in the singular form is intended to include a plurality of elements, and vice versa, unless the context clearly indicates otherwise.

In construing an element, the element is to be construed as including an error or tolerance range even where no explicit description of such an error or tolerance range is provided.

Where positional relationships are described, for example, where the positional relationship between two parts is described using "on," "over," "under," "above," "below," "beside," "next," or the like, one or more other parts may be located between the two parts unless a more limiting term, such as "immediate(ly)," "direct(ly)," or "close(ly)" is used. For example, where an element or layer is disposed "on" another element or layer, a third layer or element may be interposed therebetween.

In describing a temporal relationship, when the temporal order is described as, for example, "after," "subsequent," "next," "before," or the like, a case which is not continuous may be included unless a more limiting term, such as "just," "immediate(ly)," or "direct(ly)," is used.

Although the terms "first," "second," A, B, (a), (b), and the like may be used herein to describe various elements, these elements should not be interpreted to be limited by these terms as they are not used to define a particular order, precedence, or number of elements. These terms are used only to distinguish one element from another. For example, a first element could be termed a second element, and, similarly, a second element could be termed a first element, without departing from the scope of the present disclosure.

The expression that an element is "connected," "coupled," or "adhered" to another element or layer the element or layer can not only be directly connected or adhered to another element or layer, but also be indirectly connected or adhered to another element or layer with one or more intervening elements or layers "disposed," or "interposed" between the elements or layers, unless otherwise specified.

The term "at least one" should be understood as including any and all combinations of one or more of the associated listed items. For example, the meaning of "at least one of a first element, a second element, and a third element" encompasses the combination of all three listed elements, combinations of any two of the three elements, as well as each individual element, the first element, the second element, and the third element.

Features of various embodiments of the present disclosure may be partially or entirely coupled to or combined with each other. They may be linked and operated technically in various ways as those skilled in the art can sufficiently understand. The embodiments may be carried out independently of or in association with each other in various combinations.

Hereinafter, embodiments of the present disclosure will be described in detail with reference to the accompanying drawings. Also, the scale, dimensions, size, and thickness of each element illustrated in the drawings are represented for convenience in explanation and may be different from the actual scale, dimension, size or thickness. Thus, the present disclosure is not necessarily limited to the scale, dimensions, size, and thickness illustrated in the drawings.

FIG. 1 is a view schematically illustrating an apparatus according to an example embodiment of the present disclosure.

With reference to FIG. 1, an apparatus 1 according to a first example embodiment of the present disclosure may be a display apparatus, but embodiments of the present disclosure are not limited thereto.

The display apparatus may include a display panel including a plurality of pixels which implement a black/white or color image and a driving part for driving the display panel. A pixel may be a subpixel which configures any one of a plurality of colors configuring a color image. An apparatus according to a first example embodiment of the present disclosure may include a set device (or a set apparatus) or a set electronic device, such as a notebook computer, a TV, a computer monitor, an equipment apparatus including an automotive apparatus or another type of apparatus for vehicles, or a mobile electronic device, such as a smartphone, or an electronic pad, or the like which is a complete product (or a final product) including a display panel such as an organic light-emitting display panel, a liquid crystal display panel, or the like.

The apparatus 1 according to a first example embodiment of the present disclosure may include a passive vibration member 10 and an active vibration member 20 connected to the passive vibration member 10 through a connection member 15.

The passive vibration member 10 may vibrate based on driving (or vibration or displacing) of one or more active vibration members 20. For example, the passive vibration member 10 may generate one or more of a vibration and a sound based on driving of the active vibration member(s) 20.

The passive vibration member 10 according to an example embodiment of the present disclosure may be a display panel including a display area (or a screen) having a plurality of pixels which implement a black/white or color image. Thus, the passive vibration member 10 may generate one or more of a vibration and a sound based on driving of one or more active vibration members 20. For example, the passive vibration member 10 may vibrate based on a vibration of the active vibration member(s) 20 while a display area is displaying an image. Thus, the passive vibration member 10 may generate or output a sound synchronized with the image displayed on the display area. For example, the passive vibration member 10 may be a vibration object, a display member, a display panel, a signage panel, a passive vibration plate, a front cover, a front member, a vibration panel, a sound panel, a passive vibration panel, a sound output plate, a sound vibration plate, or an image screen, or the like, but embodiments of the present disclosure are not limited thereto.

The passive vibration member 10 according to another example embodiment of the present disclosure may be a vibration plate which includes a metal material or a nonmetal material (or a composite nonmetal material) having a material characteristic suitable for being vibrated by one or more active vibration members 20 to output sound. For example, the passive vibration member 10 may include a vibration plate which includes one or more materials among metal, plastic, paper, wood, fiber, cloth, leather, glass, carbon, and a mirror. For example, the paper may be cone paper for speakers. For example, the cone paper may be pulp or foamed plastic, or the like, but embodiments of the present disclosure are not limited thereto.

The passive vibration member 10 according to another example embodiment of the present disclosure may include a display panel including a pixel displaying an image, or may include a non-display panel. For example, the passive vibration member 10 may include one or more among a display panel including a pixel displaying an image, a screen panel on which an image is projected from a display apparatus, a lighting panel, a signage panel, a vehicular interior material, a vehicular exterior material, a vehicular glass window, a vehicular seat interior material, a building ceiling material, a building interior material, a building glass window, an aircraft interior material, an aircraft glass window, and a mirror, but embodiments of the present disclosure are not limited thereto. For example, the non-display panel may be a light-emitting diode lighting panel (or apparatus), an organic light-emitting lighting panel (or apparatus), or an inorganic light-emitting lighting panel (or apparatus), but embodiments of the present disclosure are not limited thereto.

The active vibration member 20 may be connected to a first surface of the passive vibration member 10 by the connection member 15. For example, the active vibration member 20 may be connected to a rear surface of the passive vibration member 10 by the connection member 15.

The apparatus 1 according to an example embodiment of the present disclosure may vibrate the passive vibration member 10 based on a vibration of the active vibration member 20 and thus may output a sound by a vibration of the passive vibration member 10.

Figure 2:
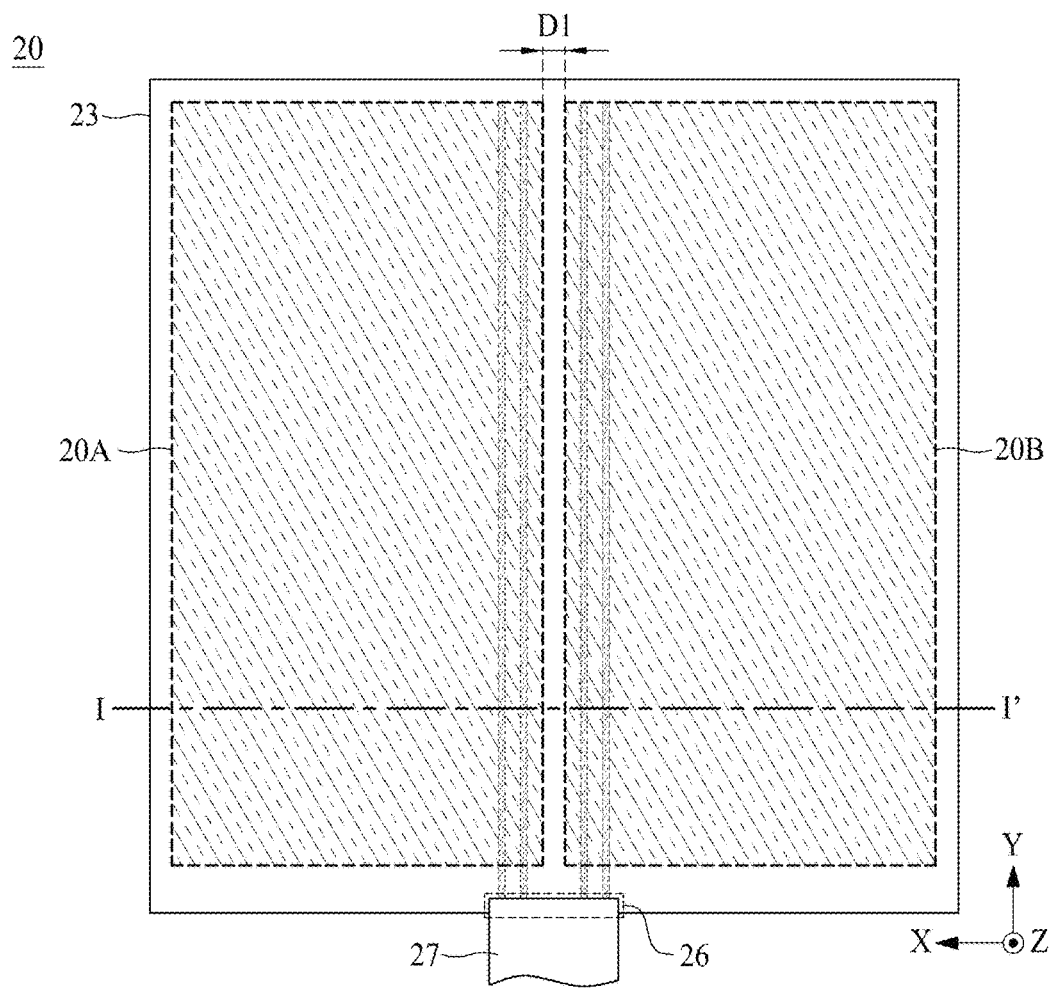
FIG. 2 illustrates an example active vibration member illustrated in FIG. 1.
Figure 3:
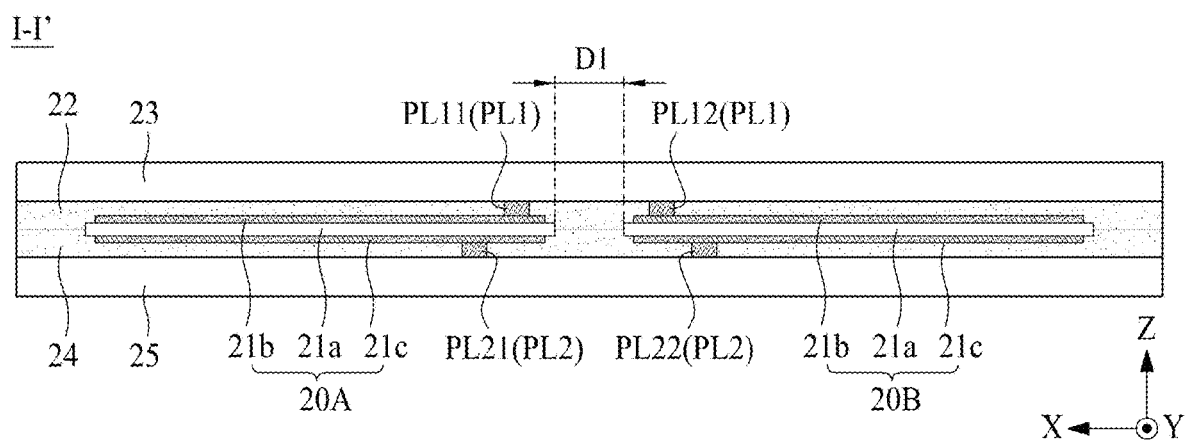
FIG. 3 is a cross-sectional view taken along line I-I' illustrated in FIG. 2.

FIG. 2 illustrates an example active vibration member illustrated in FIG. 1. FIG. 3 is a cross-sectional view taken along line I-I' illustrated in FIG. 2. FIGS. 2 and 3 illustrate an active vibration member according to an example embodiment of the present disclosure.

With reference to FIGS. 1 to 3, the active vibration member 20 according to an embodiment of the present disclosure may include a first vibration portion 20A, a second vibration portion 20B, a first cover member 23, and a second cover member 25.

The first and second vibration portions 20A and 20B may be electrically separated from each other while also being spaced apart from each other along a first direction X. Each of the first and second vibration portions 20A and 20B may alternately and repeatedly contract and/or expand based on a piezoelectric effect to vibrate. For example, the first and second vibration portions 20A and 20B may be disposed or tiled at a certain interval D1 along the first direction X. Accordingly, the active vibration member 20 in which the first and second vibration portions 20A and 20B are tiled may be referred to as a vibration array, a vibration array portion, a vibration module array portion, a vibration array structure, a tiling vibration array, a tiling vibration array module, or a tiling vibration film, but embodiments of the present disclosure are not limited thereto.

Each of the first and second vibration portions 20A and 20B according to an example embodiment of the present disclosure may have a tetragonal shape. For example, each of the first and second vibration portions 20A and 20B may have a tetragonal shape having a width of about 5 cm or more, but the present disclosure is not limited to the above shape and numeric range.

Each of the first and second vibration portions 20A and 20B may be disposed or tiled on the same plane. Thus, the active vibration member 20 may have an enlarged area based on tiling of the first and second vibration portions 20A and 20B having a relatively small size.

Each of the first and second vibration portions 20A and 20B may be disposed or tiled at a certain interval with a distance D1 between them. Thus, the first and second vibration portions 20A and 20B may be implemented as one vibration apparatus (or a single vibration apparatus) which is driven as one complete single-body without being independently driven, but embodiments of the present disclosure is not limited thereto. According to an example embodiment of the present disclosure, a first separation distance D1 between the first and second vibration portions 20A and 20B in the first direction X may be 0.1 mm or more and less than 3 cm, but embodiments of the present disclosure are not limited thereto.

According to an example embodiment of the present disclosure, each of the first and second vibration portions 20A and 20B may be disposed or tiled to have an interval (or a first separation distance) D1 of 0.1 mm or more and less than 3 cm between them. Thus, the first and second vibration portions 20A and 20B may be driven as one vibration apparatus, thereby increasing a reproduction band of a sound and a sound pressure level characteristic of a sound which is generated based on a single-body vibration of the first and second vibration portions 20A and 20B. For example, the first and second vibration portions 20A and 20B may be disposed with the interval D1 of 0.1 mm or more and less than 5 mm between them to increase a reproduction band of a sound generated based on a single-body vibration of the first and second vibration portions 20A and 20B and to increase a sound in a low-pitched sound band (for example, a sound pressure level characteristic at 500 Hz or less).

According to an example embodiment of the present disclosure, if the first and second vibration portions 20A and 20B are disposed with the interval D1 of less than 0.1 mm or without the interval D1 between them, the reliability of the first and second vibration portions 20A and 20B (or of the active vibration member 20) may be reduced or deteriorated due to a possible damage or crack caused by a physical contact between them which may occur when each of the first and second vibration portions 20A and 20B vibrates.

According to an example embodiment of the present disclosure, if the first and second vibration portions 20A and 20B are disposed with the interval D1 of 3 cm or more between them, the first and second vibration portions 20A and 20B may be driven not as one vibration apparatus due to an independent vibration of each of the first and second vibration portions 20A and 20B. Therefore, a reproduction band of a sound and a sound pressure level characteristic of a sound which is generated based on vibrations of the first and second vibration portions 20A and 20B may be reduced or deteriorated. For example, if the first and second vibration portions 20A and 20B are disposed with the interval D1 of 3 cm or more between them, a sound characteristic and a sound pressure level characteristic in the low-pitched sound band (for example, in 500 Hz or less) may each be reduced or deteriorated.

According to an example embodiment of the present disclosure, if the first and second vibration portions 20A and 20B are disposed with the interval D1 of 5 mm between them, the first and second vibration portions 20A and 20B may not be sufficiently driven as one vibration apparatus. Thus, a sound characteristic and a sound pressure level characteristic in the low-pitched sound band (for example, in 200 Hz or less) may each be reduced or deteriorated.

According to another example embodiment of the present disclosure, if the first and second vibration portions 20A and 20B are disposed with the interval D1 of 1 mm between them, for example, the first and second vibration portions 20A and 20B may be driven as one vibration apparatus. Thus, a reproduction band of a sound may increase, and a sound in the low-pitched sound band (for example, a sound pressure level characteristic in 500 Hz or less) may increase. For example, if the first and second vibration portions 20A and 20B are disposed with the interval D1 of 1 mm between them, the active vibration member 20 may be implemented as a large-area vibrator which is enlarged based on optimization of a separation distance (or the interval) between the first and second vibration portions 20A and 20B. Therefore, the active vibration member 20 may be driven as a large-area vibrator based on a single-body vibration of the first and second vibration portions 20A and 20B. Thus, a reproduction band of a sound generated based on a large-area vibration of the active vibration member 20 and a sound characteristic and a sound pressure level characteristic in the low-pitched sound band may each increase.

Therefore, to implement a single-body vibration (or one vibration apparatus) of the first and second vibration portions 20A and 20B, the interval (or the first separation distance) D1 between the first and second vibration portions 20A and 20B may be adjusted to 0.1 mm or more and less than 3 cm. In addition, to implement a single-body vibration (or one vibration apparatus) of the first and second vibration portions 20A and 20B and to increase a sound pressure level characteristic of a sound in the low-pitched sound band, the interval (or the first separation distance) D1 between the first and second vibration portions 20A and 20B may be adjusted to 0.1 mm or more and less than 5 mm.

Each of the first and second vibration portions 20A and 20B according to an example embodiment of the present disclosure may include a vibration layer 21a, a first electrode layer 21b, and a second electrode layer 21c.

The vibration layer 21a may include a piezoelectric material (or an electroactive material) having a piezoelectric effect. For example, the piezoelectric material may have a characteristic in which, when pressure or twisting (or bending) is applied to a crystalline structure by an external force, a potential difference occurs due to dielectric polarization caused by a relative position change of a positive (+) ion and a negative (−) ion, and a vibration is generated by an electric field based on a reverse voltage applied thereto. The vibration layer 21a may be configured as a ceramic-based material for generating a relatively high vibration or may be configured as a piezoelectric ceramic having a perovskite-based crystalline structure. For example, the vibration layer 21a may be referred to as a piezoelectric layer, a piezoelectric material layer, an electroactive layer, a piezoelectric material portion, an electroactive portion, a piezoelectric structure, a piezoelectric composite layer, a piezoelectric composite, or a piezoelectric ceramic composite, or the like, but embodiments of the present disclosure are not limited thereto.

The first electrode layer 21b may be disposed at a first surface (or an upper surface) of the vibration layer 21a. The first electrode layer 21b may have the same size as the vibration layer 21a or may have a smaller or larger size than the vibration layer 21a. For example, the first electrode layer 21b may be formed at a whole first surface, other than a periphery portion, of the vibration layer 21a.

The second electrode layer 21c may be disposed at a second surface (or a lower surface) which is opposite to or different from the first surface of the vibration layer 21a. The second electrode layer 21c may have the same size as the vibration layer 21a or may have a smaller size than the vibration layer 21a. For example, the second electrode layer 21c may be formed at a whole second surface, other than a periphery portion, of the vibration layer 21a. The second electrode layer 21c may have the same shape as the vibration layer 21a, but embodiments of the present disclosure are not limited thereto.

One or both of the first electrode layer 21b and the second electrode layer 21c according to an example embodiment of the present disclosure may be formed of a transparent conductive material, a semitransparent conductive material, or an opaque conductive material. For example, the transparent conductive material or the semitransparent conductive material may include indium tin oxide (ITO) or indium zinc oxide (IZO), but embodiments of the present disclosure are not limited thereto. The opaque conductive material may include aluminum (Al), copper (Cu), gold (Au), silver (Ag), molybdenum (Mo), or magnesium (Mg), or the like, or an alloy of any thereof, but embodiments of the present disclosure are not limited thereto.

The vibration layer 21a may be polarized (or poling) by a certain voltage applied to the first electrode layer 21b and the second electrode layer 21c in a certain temperature atmosphere, or in a temperature atmosphere that may be changed from a high temperature to a room temperature, but embodiments of the present disclosure are not limited thereto. For example, the vibration layer 21a may alternately and repeatedly contract or expand based on an inverse piezoelectric effect according to a sound signal (or a voice signal or a driving signal) applied to the first electrode layer 21b and the second electrode layer 21c from an external source to vibrate. For example, the vibration layer 21a may vibrate based on a vertical-direction vibration and a planar direction vibration by the signal applied to the first electrode layer 21b and the second electrode layer 21c. The vibration layer 21a may increase the displacement of the passive vibration member 10 by contraction and/or expansion of the planar direction, thereby further improving the vibration of the passive vibration member 10.

The first cover member 23 may be disposed at a first surface of each of the first and second vibration portions 20A and 20B. For example, the first cover member 23 may be configured to commonly cover the first electrode layer 21b of each of the first and second vibration portions 20A and 20B. Accordingly, the first cover member 23 may protect the first surface of each of the first and second vibration portions 20A and 20B and the first electrode layer 21b.

The second cover member 25 may be disposed at a second surface of each of the first and second vibration portions 20A and 20B. For example, the second cover member 25 may be configured to commonly cover the second electrode layer 21c of each of the first and second vibration portions 20A and 20B. Accordingly, the second cover member 25 may protect the second surface of each of the first and second vibration portions 20A and 20B and the second electrode layer 21c.

The first cover member 23 and the second cover member 25 according to an example embodiment of the present disclosure may each include one or more materials among plastic, fiber, cloth, paper, leather, carbon, and wood, but embodiments of the present disclosure are not limited thereto. For example, each of the first cover member 23 and the second cover member 25 may include the same material or may include different materials from each other. For example, each of the first cover member 23 and the second cover member 25 may be a polyimide (PI) film or a polyethylene terephthalate (PET) film, but embodiments of the present disclosure are not limited thereto.

One or both of the first cover member 23 and the second cover member 25 according to an example embodiment of the present disclosure may include an adhesive member. For example, one or both of the first cover member 23 and the second cover member 25 may include an adhesive member which is coupled to or attached to the first and second vibration portions 20A and 20B and may include a protection member (or a stripping member) which covers or protects the adhesive member. For example, the adhesive member may include an electrical insulation material which has adhesive properties and is capable of compression and decompression. For example, the first cover member 23 may include an adhesive member which is coupled to or attached to the first and second vibration portions 20A and 20B and may include a protection member (or a stripping member) which covers or protects the adhesive member.

The first cover member 23 may be connected or coupled to the first surface of the first and second vibration portions 20A and 20B or to the first electrode layer 21b by a first adhesive layer 22. For example, the first cover member 23 may be connected or coupled to the first surface of the first and second vibration portions 20A and 20B or to the first electrode layer 21b by a film laminating process using the first adhesive layer 22.

The second cover member 25 may be connected or coupled to the second surface of the first and second vibration portions 20A and 20B or to the second electrode layer 21c by a second adhesive layer 24. For example, the second cover member 25 may be connected or coupled to the second surface of the first and second vibration portions 20A and 20B or to the second electrode layer 21c by a film laminating process using the second adhesive layer 24.

Each of the first adhesive layer 22 and second adhesive layer 24 according to an example embodiment of the present disclosure may include an electric insulating material which has adhesiveness and is capable of compression and decompression. For example, each of the first adhesive layer 22 and the second adhesive layer 24 may include an epoxy resin, an acrylic resin, a silicone resin, a urethane resin, or another organic adhesive material, but embodiments of the present disclosure are not limited thereto.

The active vibration member 20 according to an example embodiment of the present disclosure may further include a first power supply line PL1 disposed at the first cover member 23, a second power supply line PL2 disposed at the second cover member 25, and a pad part 26 electrically connected to the first power supply line PL1 and the second power supply line PL2.

The first power supply line PL1 according to an example embodiment of the present disclosure may include first and second upper power lines PL11 and PL12 disposed along a second direction Y. For example, the first upper power line PL11 may be connected or electrically and directly connected to the first electrode layer 21b of the first vibration portion 20A. The second upper power line PL12 may be connected or electrically and directly connected to the first electrode layer 21b of the second vibration portion 20B.

The second power supply line PL2 according to an example embodiment of the present disclosure may include first and second lower power lines PL21 and PL22 disposed along a second direction Y. For example, the first lower power line PL21 may be connected or electrically and directly connected to the second electrode layer 21c of the first vibration portion 20A. The second lower power line PL22 may be connected or electrically and directly connected to the second electrode layer 21c of the second vibration portion 20B.

The pad part 26 may be configured at a periphery portion of any one of the first cover member 23 and the second cover member 25 to be electrically connected to a portion (or one end) of each of the first power supply line PL1 and the second power supply line PL2.

The pad part 26 according to an example embodiment of the present disclosure may include a first pad electrode electrically connected to one end of the first power supply line PL1 and a second pad electrode electrically connected to one end of the second power supply line PL2.

The pad part 26 according to another example embodiment of the present disclosure may be electrically connected to a signal cable 27. The signal cable 27 may be electrically connected to the pad part 26 disposed at the active vibration member 20 and may supply the first and second vibration portions 20A and 20B with a vibration driving signal (or a sound signal or a voice signal) provided from a vibration driving circuit. The signal cable 27 according to an example embodiment of the present disclosure may include a first terminal electrically connected to the first pad electrode of the pad part 26 and a second terminal electrically connected to the second pad electrode of the pad part 26. For example, the signal cable 27 may be configured as a flexible printed circuit cable, a flexible flat cable, a single-sided flexible printed circuit, a single-sided flexible printed circuit board, a flexible multilayer printed circuit, or a flexible multilayer printed circuit board, but embodiments of the present disclosure are not limited thereto.

Figure 4:
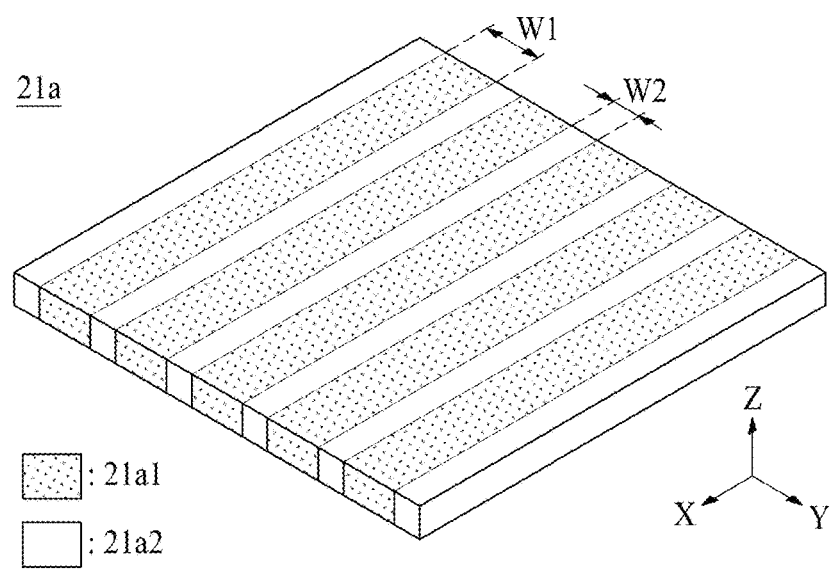
FIG. 4 is a perspective view illustrating a vibration layer according to a first example embodiment of the present disclosure.

FIG. 4 is a perspective view illustrating a vibration layer (e.g., a vibration layer 21a shown in FIG. 3) according to a first example embodiment of the present disclosure. FIG. 4 illustrates an example of the vibration layer 21a of the first and second vibration portions 20A and 20B illustrated in FIG. 3.

With reference to FIG. 4, the vibration layer 21a according to another example embodiment of the present disclosure may include a plurality of first portions 21a1 and a plurality of second portions 21a2. For example, the plurality of first portions 21a1 and the plurality of second portions 21a2 may be alternately and repeatedly arranged along a first direction X (or a second direction Y). For example, the first direction X may be a widthwise direction of the vibration layer 21a, and the second direction Y may be a lengthwise direction of the vibration layer 21a, but embodiments of the present disclosure are not limited thereto. For example, the first direction X may be the lengthwise direction of the vibration layer 21a, and the second direction Y may be the widthwise direction of the vibration layer 21a.

Each of the plurality of first portions 21a1 may be configured as an inorganic material portion or a piezoelectric material portion. The inorganic material portion may include a piezoelectric material, a composite piezoelectric material, or an electroactive material having a piezoelectric effect, but embodiments of the present disclosure are not limited thereto.

Each of the plurality of first portions 21a1 may be configured as a ceramic-based material for generating a relatively high vibration or may be configured as a piezoelectric ceramic having a perovskite-based crystalline structure, but embodiments of the present disclosure are not limited thereto.

The first portions 21a1 according to an example embodiment of the present disclosure may include one or more of lead (Pb), zirconium (Zr), titanium (Ti), zinc (Zn), nickel (Ni), and niobium (Nb), but embodiments of the present disclosure are not limited thereto.

The first portions 21a1 according to another example embodiment of the present disclosure may include a lead zirconate titanate (PZT)-based material, including lead (Pb), zirconium (Zr), and titanium (Ti), or may include a lead zirconate nickel niobate (PZNN)-based material, including lead (Pb), zirconium (Zr), nickel (Ni), and niobium (Nb), but embodiments of the present disclosure are not limited thereto. Alternatively, the first portions 21a1 may include at least one or more of calcium titanate ($CaTiO_3$), barium titanate ($BaTiO_3$), and strontium titanate ($SrTiO_3$), each without lead (Pb), but embodiments of the present disclosure are not limited thereto.

Each of the plurality of first portions 21a1 according to an example embodiment of the present disclosure may be disposed between the plurality of second portions 21a2 and may have a first width W1 parallel to the first direction X (or the second direction Y) and a length parallel to the second direction Y (or the first direction X). Each of the plurality of second portions 21a2 may have a second width W2 parallel to the first direction X (or the second direction Y) and may have a length parallel to the second direction Y (or the first direction X). The first width W1 may be the same as or different from the second width W2. For example, the first width W1 may be greater than the second width W2. For example, the first portion 21a1 and the second portion 21a2 may each include a line shape or a stripe shape which has the same size or different sizes. Therefore, the vibration layer 21a may include a 2-2 composite structure having a piezoelectric characteristic of a 2-2 vibration mode and thus may have a resonance frequency of 20 kHz or less, but embodiments of the present disclosure are not limited thereto. For example, a resonance frequency of the vibration layer 21a may vary based on at least one or more of a shape, a length, and a thickness, or the like.

In the vibration layer 21a, each of the plurality of first portions 21a1 and the plurality of second portions 21a2 may be disposed (or arranged) at the same plane (or the same layer) in parallel with each other. Each of the plurality of second portions 21a2 may be configured to fill a gap between two adjacent first portions among the plurality of first portions 21a1 and may be connected to or attached on a second portion 21a2 adjacent thereto. Therefore, the vibration layer 21a may extend by a desired size or length based on the side coupling (or connection) of the first portions 21a1 and the second portions 21a2.

In the vibration layer 21a, each of the plurality of first portions 21a1 may have different sizes (or widths) from one another. For example, a size (or a width) of each of the plurality of first portions 21a1 may progressively decrease or increase in a direction from a center portion to both peripheries (or both ends or both side portions) of the vibration layer 21a. For example, in the vibration layer 21a, a sound pressure level characteristic of a sound may be enhanced, and a sound reproduction band may increase, based on various natural vibration frequencies according to a vibration of each of the plurality of first portions 21a1 having different sizes.

The plurality of second portions 21a2 may be disposed between the plurality of first portions 21a1. Therefore, in the vibration layer 21a, vibration energy by a link in a unit lattice of each first portion 21a1 may increase by a corresponding second portion 21a2. Thus, a vibration characteristic may be enhanced, and a piezoelectric characteristic and flexibility may be secured. For example, the second portion 21a2 may include one or more of an epoxy-based polymer, an acrylic-based polymer, and a silicone-based polymer, but embodiments of the present disclosure are not limited thereto.

The plurality of second portions 21a2 according to an example embodiment of the present disclosure may be configured as an organic material portion. For example, the organic material portion may be disposed between the inorganic material portions. Thus, the organic material portion may absorb an impact applied to the inorganic material portion (or the first portion), may release a stress concentrating on the inorganic material portion to enhance the total durability of the vibration layer 21a, and may provide flexibility to the vibration layer 21a or the active vibration member 20.

The organic material portion configured at the second portion 21a2 may include one or more of an organic material, an organic polymer, an organic piezoelectric material, and an organic non-piezoelectric material that has a flexible characteristic in comparison with the inorganic material portion of the first portions 21a1. For example, the second portion 21a2 may be referred to as an adhesive portion, an elastic portion, a bending portion, a damping portion, or a flexible portion, or the like each having flexibility, but embodiments of the present disclosure are not limited thereto.

The plurality of first portions 21a1 and the second portion 21a2 may be disposed on (or connected to) the same plane, and thus, the vibration layer 21a according to an example embodiment of the present disclosure may have a single thin film-type. For example, the vibration layer 21a may have a structure in which a plurality of first portions 21a1 are connected along one direction. For example, the plurality of first portions 21a1 may have a structure connected along the entire vibration layer 21a. For example, the vibration layer 21a may be vibrated in a vertical direction by the first portion 21a1 having a vibration characteristic and may be bent in a curved shape by the second portion 21a2 having flexibility.

Figure 5:
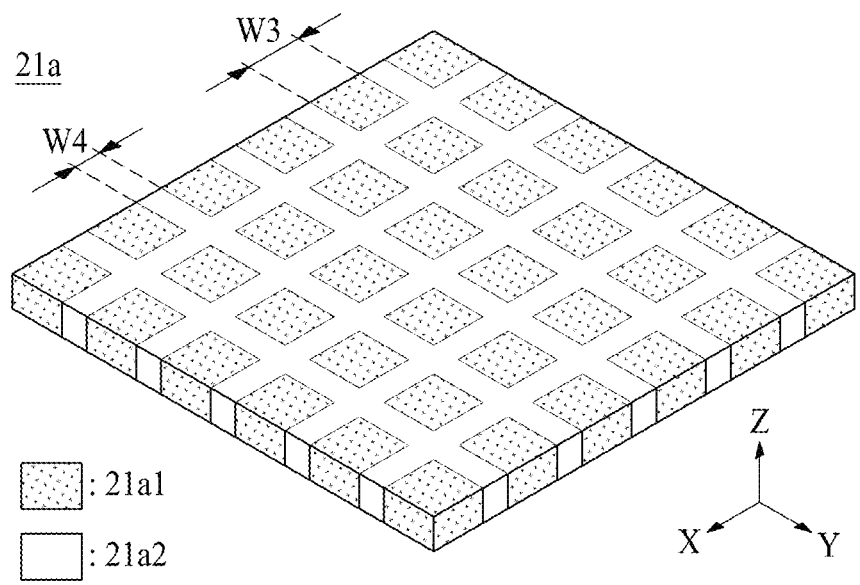
FIG. 5 is a perspective view illustrating another example embodiment of a vibration layer.

FIG. 5 is a perspective view illustrating another example embodiment of a vibration layer (e.g., 21a) illustrated in FIG. 3.

With reference to FIG. 5, the vibration layer 21a according to another example embodiment of the present disclosure may include a plurality of first portions 21a1 which are spaced apart from one another along a first direction X and a second direction Y, and a second portion 21a2 disposed between the plurality of first portions 21a1.

Each of the plurality of first portions 21a1 may be disposed to be spaced apart from one another along each of the first direction X and the second direction Y. For example, each of the plurality of first portions 21a1 may have a hexahedral shape (or a six-sided object shape) having the same size and may be disposed in a lattice shape. Each of the plurality of first portions 21a1 may include a piezoelectric material which may be be substantially the same as that of the example first portion 21a1 described above with reference to FIG. 4. Thus, the repetitive description of similar elements with like reference numerals may be omitted or briefly provided.

The second portion 21a2 may be disposed between the plurality of first portions 21a1 along each of the first direction X and the second direction Y. The second portion 21a2 may be configured to fill a gap or a space between two adjacent first portions 21a1 or to surround each of the plurality of first portions 21a1. Thus, the second portion 21a2 may be connected to or attached on an adjacent first portion 21a1. According to an example embodiment of the present disclosure, a width W4 of a second portion 21a2 disposed between two first portions 21a1 adjacent to each other along the first direction X may be the same as or different from that of a width W3 of the first portion 21a1 in the first direction X. The width W4 of the second portion 21a2 disposed between two first portions 21a1 adjacent to each other along the second direction Y may be the same as or different from the width W3 of the first portion 21a1 in the second direction Y. The second portion 21a2 may include an organic material which may be substantially the same as that of the second portion 21a2 described above with reference to FIG. 4. Thus, the repetitive description of similar elements with like reference numerals may be omitted or briefly provided.

The vibration layer 21a according to another example embodiment of the present disclosure may include a 1-3 composite structure having a piezoelectric characteristic of a 1-3 vibration mode and thus may have a resonance frequency of 30 MHz or less, but embodiments of the present disclosure are not limited thereto. For example, a resonance frequency of the vibration layer 21a may vary based on at least one or more of a shape, a length, and a thickness, or the like.

Figure 6:
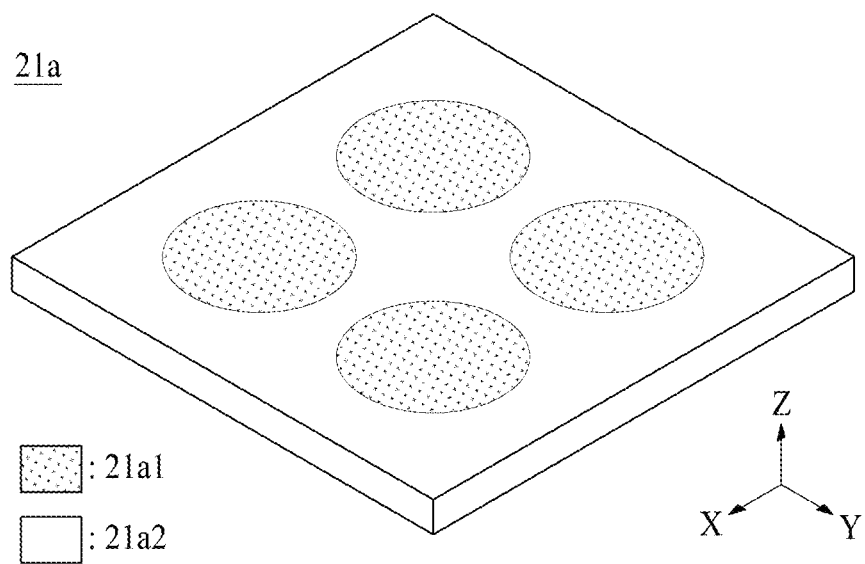
FIG. 6 is a perspective view illustrating another example embodiment of a vibration layer.

FIG. 6 is a perspective view illustrating another example embodiment of a vibration layer (e.g., 21a) illustrated in FIG. 3.

With reference to FIG. 6, the vibration layer 21a according to another example embodiment of the present disclosure may include a plurality of first portions 21a1 which are spaced apart from one another along a first direction X and a second direction Y, and a second portion 21a2 disposed between the plurality of first portions 21a1.

Each of the plurality of first portions 21a1 may have a flat structure of a circular shape. For example, each of the plurality of first portions 21a1 may have a circular plate shape, but embodiments of the present disclosure are not limited thereto. For example, each of the plurality of first portions 21a1 may have a dot shape including an oval shape, a polygonal shape, or a donut shape. Each of the plurality of first portions 21a1 may include a piezoelectric material which may be substantially the same as that of the first portion 21a1 described above with reference to FIG. 4. Thus, the repetitive description of similar elements with like reference numerals may be omitted or briefly provided.

The second portion 21a2 may be disposed between the plurality of first portions 21a1 along each of the first direction X and the second direction Y. The second portion 21a2 may be configured to surround each of the plurality of first portions 21a1 and thus may be connected to or attached on a side surface of each of the plurality of first portions 21a1. Each of the plurality of first portions 21a1 and the second portion 21a2 may be disposed (or arranged) in parallel on the same plane (or the same layer). The second portion 21a2 may include an organic material which may be substantially the same as that of the second portion 21a2 described above with reference to FIG. 4. Thus, the repetitive description of similar elements with like reference numerals may be omitted.

Figure 7:
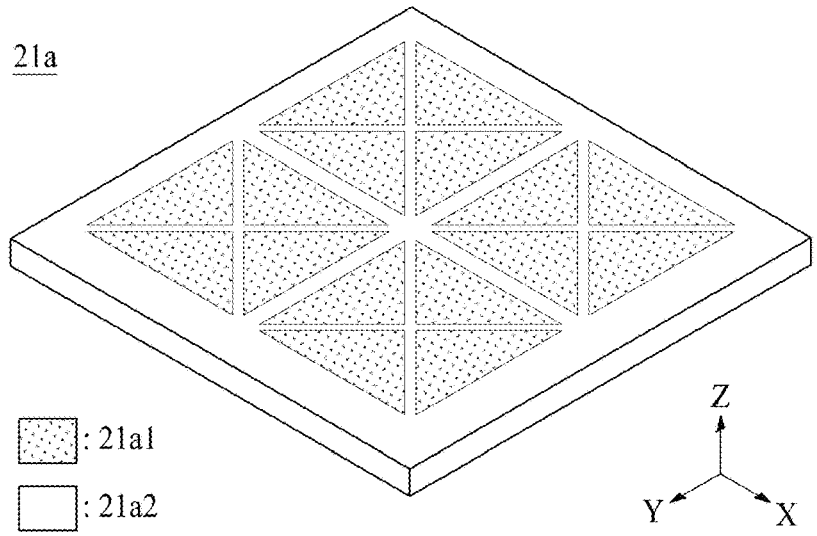
FIG. 7 is a perspective view illustrating another example embodiment of a vibration layer.

FIG. 7 is a perspective view illustrating another example embodiment of a vibration layer (e.g., 21a) illustrated in FIG. 3.

With reference to FIG. 7, the vibration layer 21a according to another example embodiment of the present disclosure may include a plurality of first portions 21a1 which are spaced apart from one another along a first direction X and a second direction Y, and a second portion 21a2 disposed between the plurality of first portions 21a1.

Each of the plurality of first portions 21a1 may have a flat structure of a triangular shape. For example, each of the plurality of first portions 21a1 may have a triangular plate shape, but embodiments of the present disclosure are not limited thereto. Each of the plurality of first portions 21a1 may include a piezoelectric material which may be substantially the same as that of the first portion 21a1 described above with reference to FIG. 4. Thus, the repetitive description of similar elements with like reference numerals may be omitted or briefly provided.

According to an example embodiment of the present disclosure, four adjacent first portions 21a1 among the plurality of first portions 21a1 may be adjacent to one another to form a tetragonal (or a square shape or quadrilateral shape). Vertices of the four adjacent first portions 21a1 forming a tetragonal shape may be adjacent to one another in a center portion (or a central portion) of the tetragonal shape.

The second portion 21a2 may be disposed between the plurality of first portions 21a1 along each of the first direction X and the second direction Y. The second portion 21a2 may be configured to surround each of the plurality of first portions 21a1 and thus may be connected to or attached on a side surface of each of the plurality of first portions 21a1. Each of the plurality of first portions 21a1 and the second portion 21a2 may be disposed (or arranged) in parallel on the same plane (or the same layer). The second portion 21a2 may include an organic material which may be substantially the same as that the second portion 21a2 described above with reference to FIG. 4. Thus, the repetitive description of similar elements with like reference numerals may be omitted or briefly provided.

According to another example embodiment of the present disclosure, 2N (where N is a natural number greater than or equal to 2) adjacent first portions 21a1 among the plurality of first portions 21a1 having the triangular shape may be disposed adjacent to one another to form a 2N-angular shape. For example, six adjacent first portions 21a1 among the plurality of first portions 21a1 may be adjacent to one another to form a hexagonal shape (or a regularly hexagonal shape). Vertices of the six adjacent first portions 21a1 forming a hexagonal shape may be adjacent to one another in a center portion (or a central portion) of the hexagonal shape. The second portion 21a2 may be configured to surround each of the plurality of first portions 21a1 and thus may be connected to or attached on a side surface of each of the plurality of first portions 21a1. Each of the plurality of first portions 21a1 and the second portion 21a2 may be disposed (or arranged) in parallel on the same plane (or the same layer).

Figure 8:
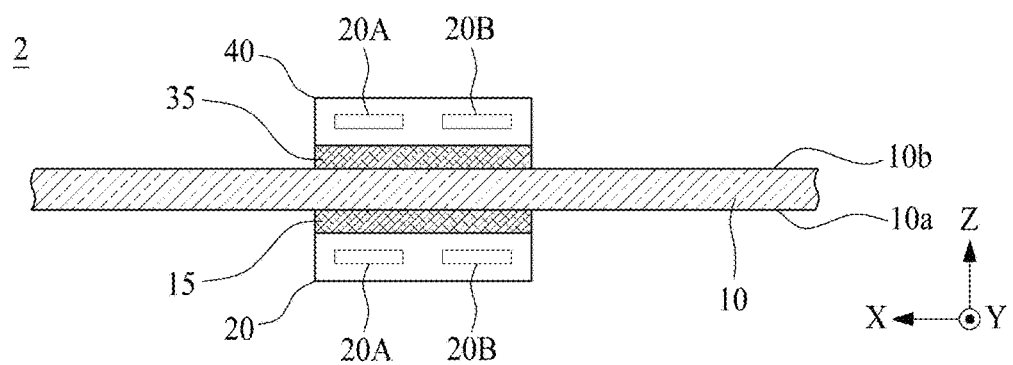
FIG. 8 is a cross-sectional view illustrating an apparatus according to a second example embodiment of the present disclosure.

FIG. 8 is a cross-sectional view illustrating an apparatus according to a second example embodiment of the present disclosure.

With reference to FIG. 8, an apparatus 2 according to a second example embodiment of the present disclosure may include a passive vibration member 10, a first active vibration member 20, and a second active vibration member 40.

The passive vibration member 10 may be the same as the passive vibration member 10 described above with reference to FIG. 1. Thus, the repetitive description thereof may be omitted or briefly provided.

The first active vibration member 20 may be connected to a first surface 10a of the passive vibration member 10 through a first connection member 15. For example, the first active vibration member 20 may be connected to a rear surface 10a of the passive vibration member 10 through a first connection member 15.

The second active vibration member 40 may overlap or be stacked to the first active vibration member 20 and may be connected to a second surface 10b of the passive vibration member 10 through a second connection member 35. For example, the second active vibration member 40 may be connected to a front surface 10b of the passive vibration member 10 to overlap or to be stacked to at least a portion of the first active vibration member 20 with the passive vibration member 10 therebetween. For example, the second active vibration member 40 may face the first active vibration member 20 with the passive vibration member 10 therebetween or may be disposed in a vertically symmetric structure with respect to the passive vibration member 10.

Each of the first active vibration member 20 and the second active vibration member 40 may be configured to be substantially like the active vibration member 20 according to example embodiments of the present disclosure described above with reference to FIGS. 2 to 7. Thus, repetitive descriptions thereof may be omitted or briefly provided.

First and second vibration portions 20A and 20B of the first active vibration member 20 may respectively overlap or be stacked to the first and second vibration portions 20A and 20B of the second active vibration member 40 in a one-to-one relationship. For example, the first vibration portion 20A of the second active vibration member 40 may overlap or be stacked to the first vibration portion 20A of the first active vibration member 20, and the second vibration portion 20B of the second active vibration member 40 may overlap or be stacked to the second vibration portion 20B of the first active vibration member 20.

The first active vibration member 20 and the second active vibration member 40 may have a structure which is inverted to each other and may be configured to displace (or vibrate) along the same direction to each other. For example, a driving signal applied to the first active vibration member 20 may have a phase which is opposite to that of a driving signal applied to the second active vibration member 40, but embodiments of the present disclosure are not limited thereto. For example, a phase of the driving signal applied to the first active vibration member 20 may have opposite phases (or anti-phases) with respect to a phase of the driving signal applied to the second active vibration member 40.

The apparatus 2 according to the second example embodiment of the present disclosure may include a vertical stack structure of the first active vibration member 20 and the second active vibration member 40. Thus, the apparatus 2 may increase a displacement width (or a vibration width) of the passive vibration member 10 based on a vibration of each of the first active vibration member 20 and the second active vibration member 40, thereby enhancing a sound pressure level characteristic and/or a sound characteristic of a low-pitched sound band generated based on a vibration of the passive vibration member 10.

Figure 9:
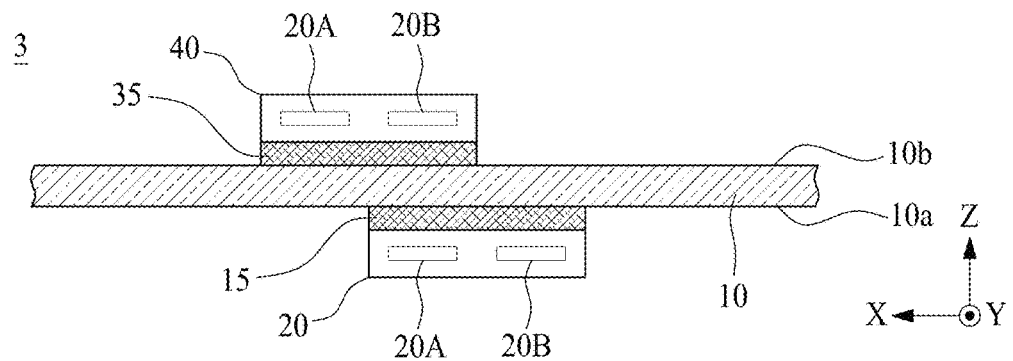
FIG. 9 is a cross-sectional view illustrating an apparatus according to a third example embodiment of the present disclosure.

FIG. 9 is a cross-sectional view illustrating an apparatus according to a third example embodiment of the present disclosure.

With reference to FIG. 9, an apparatus 3 according to a third example embodiment of the present disclosure may include a passive vibration member 10, a first active vibration member 20, and a second active vibration member 40.

The first active vibration member 20 and the second active vibration member 40 may be arranged to be staggered. Thus, the apparatus 3 according to a third example embodiment of the present disclosure may differ from the apparatus 2 according to the second example embodiment of the present disclosure. Therefore, hereinafter, the apparatus 3 according to the third example embodiment of the present disclosure will be described with reference to a difference with the apparatus 2 according to the second example embodiment of the present disclosure.

In the apparatus 3 according to the third example embodiment of the present disclosure, the first active vibration member 20 and the second active vibration member 40 may be disposed to overlap each other in part (e.g., by half). For example, a first vibration portion 20A of the first active vibration member 20 may be disposed to overlap a second vibration portion 20B of the second active vibration member 40.

The apparatus 3 according to the third example embodiment of the present disclosure may include a staggered stack structure of the first active vibration member 20 and the second active vibration member 40, and may increase a displacement width (or a vibration width) of a passive vibration member 10 based on a vibration of each of the first active vibration member 20 and the second active vibration member 40. Thus, a sound pressure level characteristic and/or a sound characteristic of the low-pitched sound band generated based on a vibration of the passive vibration member 10 may be enhanced.

Figure 10:
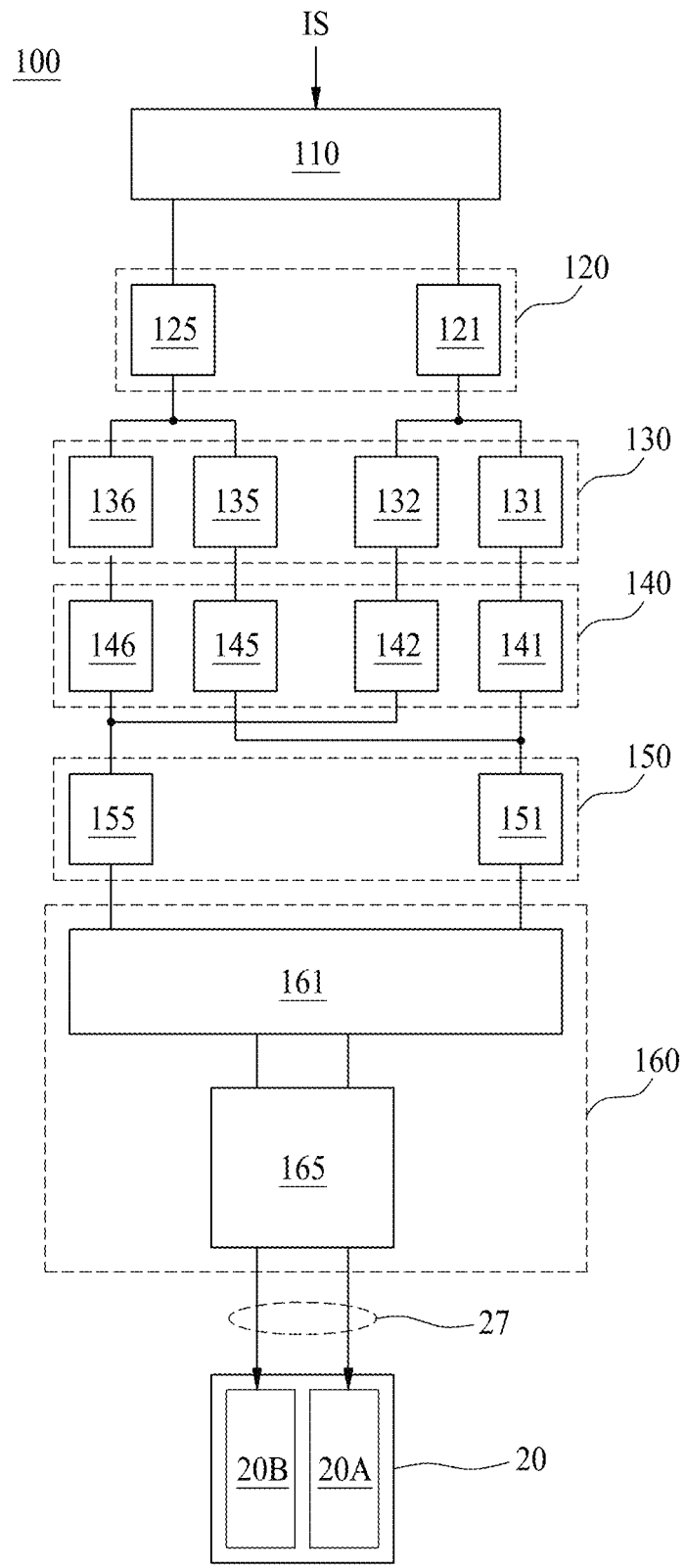
FIG. 10 is a block diagram illustrating a driving apparatus according to a first example embodiment of the present disclosure.

FIG. 10 is a block diagram illustrating a driving apparatus according to a first example embodiment of the present disclosure. FIG. 10 illustrates an example driving apparatus of an apparatus according to a first example embodiment of the present disclosure described above with reference to FIGS. 1 to 7.

With reference to FIG. 10, a driving apparatus 100 according to the first example embodiment of the present disclosure may include a signal separation circuit 110, a filter circuit 130, a correction circuit 140, a mixing circuit 150, and a driving signal generator 160.

The signal separation circuit 110 may be configured to separate an input signal IS input thereto into a low-pitched sound band signal and a high-pitched sound band signal based on control by a host controller. For example, the signal separation circuit 110 may separate the input signal IS into a first-pitched sound band and a second-pitched sound band which differs from the first-pitched sound band and may output signals of the first-pitched sound band and the second-pitched sound band. For example, the signal separation circuit 110 may be configured to separate the input signal IS into a low-pitched sound band signal and a high-pitched sound band signal with respect to 500 Hz as a threshold between them. For example, the signal separation circuit 110 may be configured to separate the input signal into the first-pitched sound band and the second-pitched sound band with respect to 500 Hz as a threshold between them. For example, the signal separation circuit 110 may include one or more crossover circuits.

The filter circuit 130 may output the first and second high-pitched sound band signals based on the high-pitched sound band signal supplied from the signal separation circuit 110. For example, the filter circuit 130 may filter the high-pitched sound band signal supplied from the signal separation circuit 110 to output the first and second high-pitched sound band signals. The filter circuit 130 may output first and second low-pitched sound band signals based on the low-pitched sound band signal supplied from the signal separation circuit 110. For example, the filter circuit 130 may filter the low-pitched sound band signal supplied from the signal separation circuit 110 to output the first and second low-pitched sound band signals.

The filter circuit 130 may temporally delay the high-pitched sound band signal supplied from the signal separation circuit 110 to output the first and second high-pitched sound band signals. The filter circuit 130 may temporally delay the low-pitched sound band signal supplied from the signal separation circuit 110 to output the first and second low-pitched sound band signals.

The filter circuit 130 according to an example embodiment of the present disclosure may include a first high sound filter 131, a second high sound filter 132, a first low sound filter 135, and a second low sound filter 136.

The first high sound filter 131 may delay the high-pitched sound band signal supplied from the signal separation circuit 110 for (or by) a first high sound delay time to output the first high-pitched sound band signal. The second high sound filter 132 may delay the high-pitched sound band signal supplied from the signal separation circuit 110 for (or by) a second high sound delay time to output the second high-pitched sound band signal.

According to an example embodiment of the present disclosure, with respect to the input signal IS, the second high sound delay time may be equal to or different from the first high sound delay time. For example, when a high sound is temporally delayed, because amplification attenuation or constructive interference and destructive interference occur in a complex manner, the high sound may be non-uniform, and a sound quality may be degraded. Accordingly, each of the first high sound delay time and the second high sound delay time may be adjusted within a range where the sound quality of the high sound is not degraded. For example, with respect to the input signal IS, each of the first high sound delay time and the second high sound delay time may be adjusted to be equal to or different from each other within a range from 0 ms to 10 ms.

The first low sound filter 135 may delay the low-pitched sound band signal supplied from the signal separation circuit 110 for (or by) a first low sound delay time and may output the first low-pitched sound band signal. The second low sound filter 136 may delay the low-pitched sound band signal supplied from the signal separation circuit 110 for (or by) a second low sound delay time and may output the second low-pitched sound band signal.

According to an example embodiment of the present disclosure, with respect to the input signal IS, the second low sound delay time may differ from the first low sound delay time. For example, when the low sound is temporally delayed, a sound quality may not be greatly reduced or degraded by amplification attenuation or constructive interference and destructive interference in a low sound having a long period in comparison to the high sound. Accordingly, the first low sound delay time may be differentiated from the second low sound delay time, and the low-pitched sound band may be extended based on the first low sound delay time and the second low sound delay time of the low-pitched sound band signal.

According to an example embodiment of the present disclosure, with respect to the input signal IS, each of the first low sound delay time and the second low sound delay time may be adjusted to be different from each other within 30 ms.

According to another example embodiment of the present disclosure, each of the first low sound delay time and the second low sound delay time may be adjusted to have a time difference within a range of 0.1 ms to 30 ms.

The correction circuit 140 may be configured to correct the sound quality of each of the first and second high-pitched sound band signals and the first and second low-pitched sound band signals supplied from the filter circuit 130. For example, the correction circuit 140 may correct each of the first and second high-pitched sound band signals and the first and second low-pitched sound band signals to output each of a first high-pitched sound band correction signal, a second high-pitched sound band correction signal, a first low-pitched sound band correction signal, and a second low-pitched sound band correction signal.

According to an example embodiment of the present disclosure, with respect to a reference level, the correction circuit 140 may cut or amplify a frequency range of each of the first and second high-pitched sound band signals and the first and second low-pitched sound band signals. Thus, the correction circuit 140 may reinforce the sound quality of each of the first and second high-pitched sound band signals and the first and second low-pitched sound band signals or may improve the flatness thereof and may output the quality-reinforced signal or the flatness-improved signal. For example, with respect to a frequency-based reference sound pressure level, the correction circuit 140 may amplify or attenuate each of the first and second high-pitched sound band signals and the first and second low-pitched sound band signals. For example, the correction circuit 140 may be configured to amplify each of the first and second high-pitched sound band signals up to a maximum of 3 decibels (+3 dB).

The correction circuit 140 according to an example embodiment of the present disclosure may include a first high sound correction circuit 141, a second high sound correction circuit 142, a first low sound correction circuit 145, and a second low sound correction circuit 146.

With respect to a frequency-based reference level, the first high sound correction circuit 141 may amplify or attenuate the first high-pitched sound band signal to output the first high-pitched sound band correction signal. With respect to a frequency-based reference level, the second high sound correction circuit 142 may amplify or attenuate the second high-pitched sound band signal to output the second high-pitched sound band correction signal. For example, each of the first and second high sound correction circuits 141 and 142 may be configured to amplify a corresponding high-pitched sound band signal up to 3 decibels (+3 dB). For example, each of the first and second high sound correction circuits 141 and 142 may be a parametric equalizer, but embodiments of the present disclosure are not limited thereto.

With respect to a frequency-based reference level, the first low sound correction circuit 145 may amplify or attenuate the first low-pitched sound band signal to output the first low-pitched sound band correction signal. With respect to a frequency-based reference level, the second low sound correction circuit 146 may amplify or attenuate the second low-pitched sound band signal to output the second low-pitched sound band correction signal. For example, each of the first and second low sound correction circuits 145 and 146 may be a parametric equalizer, but embodiments of the present disclosure are not limited thereto.

The driving apparatus 100 according to the first example embodiment of the present disclosure may further include a level adjustment circuit 120 for reducing, preventing, or minimizing an overshoot of signal amplification by the correction circuit 140.

The level adjustment circuit 120 may attenuate a level of each of the high-pitched sound band signal supplied from the signal separation circuit 110 based on a gain value and may output the level-attenuated signal to each of first and second high sound filters 131 and 132 of the filter circuit 130. Also, the level adjustment circuit 120 may adjust one or more of a phase and an amplitude of the low-pitched sound band signal supplied from the signal separation circuit 110 based on a gain value and may output the adjusted signal to each of first and second low sound filters 135 and 136 of the filter circuit 130.

The level adjustment circuit 120 according to an example embodiment of the present disclosure may include a high sound level adjustment circuit 121 and a low sound level adjustment circuit 125.

The high sound level adjustment circuit 121 may attenuate a level of the high-pitched sound band signal supplied from the signal separation circuit 110 based on a gain value and may output the level-attenuated signal to each of first and second high sound filters 131 and 132 of the filter circuit 130.

The low sound level adjustment circuit 125 may adjust one or more of a phase and an amplitude of the low-pitched sound band signal supplied from the signal separation circuit 110 based on a gain value and may output the adjusted signal to each of first and second low sound filters 135 and 136 of the filter circuit 130.

The mixing circuit 150 may mix and output the first high-pitched sound band correction signal supplied from the first high sound correction circuit 141 and the first low-pitched sound band correction signal supplied from the first low sound correction circuit 145. In addition, the mixing circuit 150 may mix and output the second high-pitched sound band correction signal supplied from the second high sound correction circuit 142 and the second low-pitched sound band correction signal supplied from the second low sound correction circuit 146.

The mixing circuit 150 according to an example embodiment of the present disclosure may include a first mixing circuit 151 and a second mixing circuit 155.

The first mixing circuit 151 may mix the first high-pitched sound band correction signal supplied from the first high sound correction circuit 141 of the correction circuit 140 and the first low-pitched sound band correction signal supplied from the first low sound correction circuit 145 to generate a first mixing signal and may supply the generated first mixing signal to the driving signal generator 160.

The second mixing circuit 155 may mix the second high-pitched sound band correction signal supplied from the second high sound correction circuit 142 of the correction circuit 140 and the second low-pitched sound band correction signal supplied from the second low sound correction circuit 146 to generate a second mixing signal and may supply the generated second mixing signal to the driving signal generator 160.

The driving signal generator 160 may output a first driving signal based on the first mixing signal supplied from the first mixing circuit 151 and may output a second driving signal based on the second mixing signal supplied from the second mixing circuit 155.

The driving signal generator 160 according to an example embodiment of the present disclosure may include a digital-to-analog converter 161 and an amplifier 165.

The digital-to-analog converter 161 may respectively convert the first mixing signal and the second mixing signal supplied from the mixing circuit 150 into first and second analog signals and may output the first and second analog signals.

The amplifier 165 may respectively amplify the first and second analog signals supplied from the digital-to-analog converter 161 to the first and second driving signals. The first and second driving signals may be respectively supplied to the first vibration portion 20A and the second vibration portion 20B through a pad part 26 (see FIG. 2) at the active vibration member 20 through a signal cable 27.

The driving apparatus 100 according to the first example embodiment of the present disclosure may supply a time-delayed low-pitched sound band driving signal to each of the first vibration portion 20A and the second vibration portion 20B tiled to the active vibration member 20. Thus, the driving apparatus 100 may vibrate the active vibration member 20 in a mode shape or may correct a mode shape of the active vibration member 20 to enhance a sound pressure level characteristic of the active vibration member 20, thereby enhancing a sound pressure level characteristic and/or a sound characteristic of the low-pitched sound band and extending the low-pitched sound band.

Figure 11:
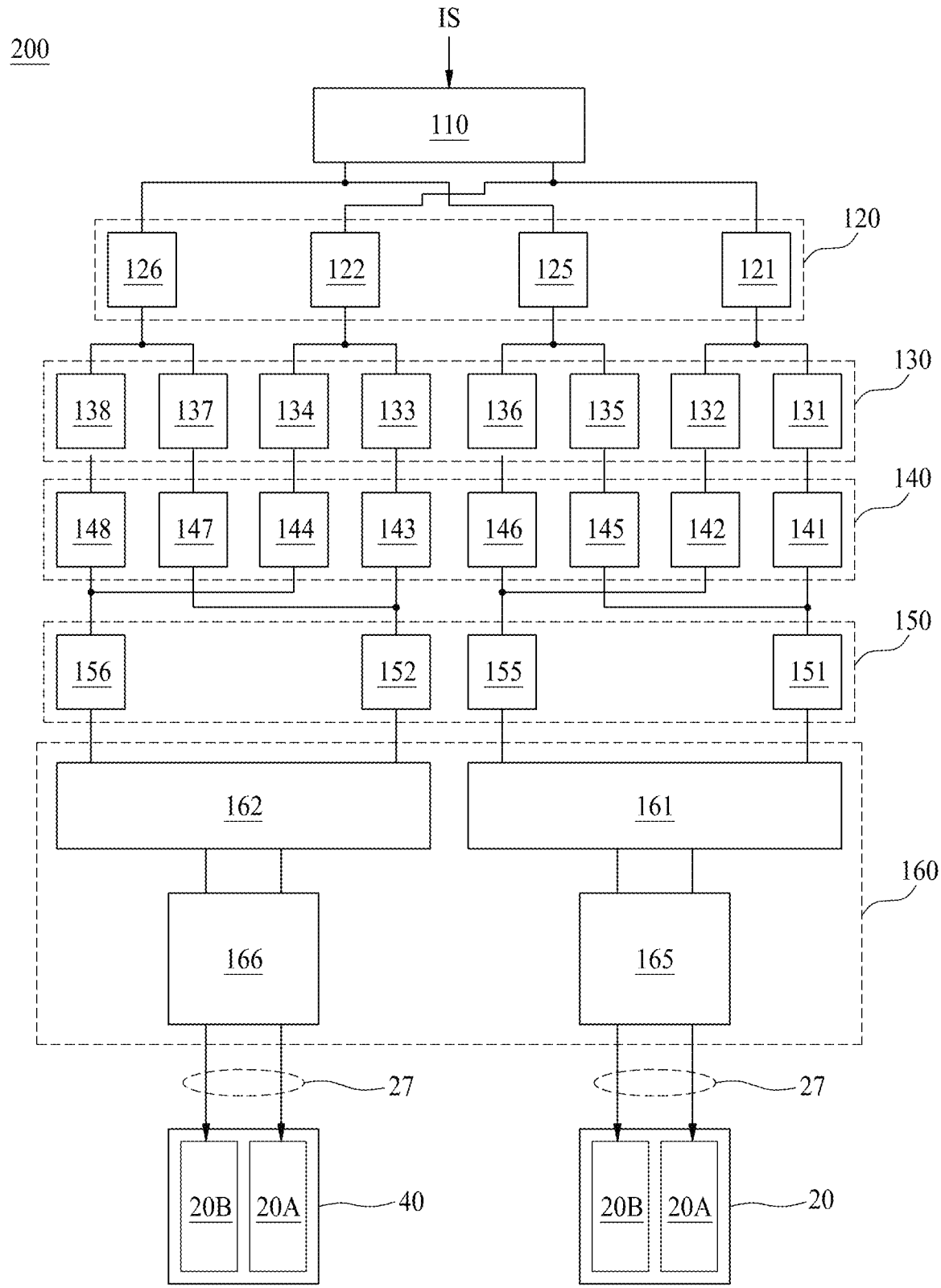
FIG. 11 is a block diagram illustrating a driving apparatus according to a second example embodiment of the present disclosure.

FIG. 11 is a block diagram illustrating a driving apparatus according to a second example embodiment of the present disclosure. FIG. 11 illustrates a driving apparatus of an apparatus according to a second example embodiment or a third example embodiment of the present disclosure described above with reference to FIG. 8 or FIG. 9.

With reference to FIG. 11, a driving apparatus 100 according to the second example embodiment of the present disclosure may include a signal separation circuit 110, a filter circuit 130, a correction circuit 140, a mixing circuit 150, and a driving signal generator 160.

The signal separation circuit 110 may be configured to separate an input signal IS input thereto into a low-pitched sound band signal and a high-pitched sound band signal based on control by a host controller. For example, the signal separation circuit 110 may separate the input signal IS into a first-pitched sound band and a second-pitched sound band which differs from the first-pitched sound band and may output signals of the first-pitched sound band and the second-pitched sound band. For example, the signal separation circuit 110 may be configured to separate the input signal into a low-pitched sound band signal and a high-pitched sound band signal with respect to 500 Hz as a threshold between them. For example, the signal separation circuit 110 may be configured to separate the input signal into the first-pitched sound band and the second-pitched sound band with respect to 500 Hz as a threshold between them. For example, the signal separation circuit 110 may include one or more crossover circuits.

The filter circuit 130 may output the first to the fourth high-pitched sound band signals based on the high-pitched sound band signal supplied from the signal separation circuit 110. For example, the filter circuit 130 may filter the high-pitched sound band signal supplied from the signal separation circuit 110 to output the first to the fourth high-pitched sound band signals. The filter circuit 130 may output first to fourth low-pitched sound band signals based on the low-pitched sound band signal supplied from the signal separation circuit 110. For example, the filter circuit 130 may filter the low-pitched sound band signal supplied from the signal separation circuit 110 to output the first to the fourth low-pitched sound band signals.

The filter circuit 130 may temporally delay the high-pitched sound band signal supplied from the signal separation circuit 110 to output the first to the fourth high-pitched sound band signals. The filter circuit 130 may temporally delay the low-pitched sound band signal supplied from the signal separation circuit 110 to output the first to the fourth low-pitched sound band signals.

The filter circuit 130 according to an example embodiment of the present disclosure may include first to fourth high sound filters 131, 132, 133, and 134, and first to fourth low sound filters 135, 136, 137, and 138.

The first high sound filter 131 may delay the high-pitched sound band signal supplied from the signal separation circuit 110 for (or by) a first high sound delay time to output the first high-pitched sound band signal. The second high sound filter 132 may delay the high-pitched sound band signal supplied from the signal separation circuit 110 for (or by) a second high sound delay time to output the second high-pitched sound band signal. The third high sound filter 133 may delay the high-pitched sound band signal supplied from the signal separation circuit 110 for (or by) a third high sound delay time to output the third high-pitched sound band signal. The fourth high sound filter 134 may delay the high-pitched sound band signal supplied from the signal separation circuit 110 for (or by) a fourth high sound delay time to output the fourth high-pitched sound band signal.

Similar to that described above with reference to FIG. 10, with respect to the input signal IS, each of the first to the fourth high sound delay times may be adjusted to be equal to or different from each other within the range from 0 ms to 10 ms, but embodiments of the present disclosure are not limited thereto.

The first low sound filter 135 may delay the low-pitched sound band signal supplied from the signal separation circuit 110 for (or by) a first low sound delay time and may output the first low-pitched sound band signal. The second low sound filter 136 may delay the low-pitched sound band signal supplied from the signal separation circuit 110 for (or by) a second low sound delay time and may output the second low-pitched sound band signal. The third low sound filter 137 may delay the low-pitched sound band signal supplied from the signal separation circuit 110 for (or by) a third low sound delay time and may output the third low-pitched sound band signal. The fourth low sound filter 138 may delay the low-pitched sound band signal supplied from the signal separation circuit 110 for (or by) a fourth low sound delay time and may output the fourth low-pitched sound band signal.

Similar to that described above with reference to FIG. 10, with respect to the input signal IS, each of the first to the fourth low sound delay times may be adjusted to be different from each other within 30 ms. According to an example embodiment of the present disclosure, the first low sound delay time and the third low sound delay time may be adjusted to be equal to or different from each other. The second low sound delay time and the fourth low sound delay time may be adjusted to be equal to or different from each other. According to another example embodiment of the present disclosure, similar to that described above with reference to FIG. 10, each of the first to the fourth low sound delay times may be adjusted to have a time difference within a range from 0.1 ms to 30 ms.

The correction circuit 140 may be configured to correct the sound quality of each of the first to the fourth high-pitched sound band signals and the first to the fourth low-pitched sound band signals supplied from the filter circuit 130. For example, the correction circuit 140 may correct each of the first to the fourth high-pitched sound band signals and the first to the fourth low-pitched sound band signals to output each of first to fourth high-pitched sound band correction signals and first to fourth low-pitched sound band correction signals.

According to an example embodiment of the present disclosure, with respect to a reference level, the correction circuit 140 may cut or amplify a frequency range of each of the first to the fourth high-pitched sound band signals and the first to the fourth low-pitched sound band signals. Thus, the correction circuit 140 may reinforce the sound quality of each of the first to the fourth high-pitched sound band signals and the first to the fourth low-pitched sound band signals or may improve the flatness thereof and may output the quality-reinforced signal or the flatness-improved signal. For example, with respect to a frequency-based reference sound pressure level, the correction circuit 140 may amplify or attenuate each of the first to the fourth high-pitched sound band signals and the first to the fourth low-pitched sound band signals. For example, the correction circuit 140 may be configured to amplify each of the first to the fourth high-pitched sound band signals up to a maximum of 3 decibels (+3 dB).

The correction circuit 140 according to an example embodiment of the present disclosure may include first to fourth high sound correction circuits 141, 142, 143, and 144, and first to fourth low sound correction circuits 145, 146, 147, and 148.

With respect to a frequency-based reference level, the first high sound correction circuit 141 may amplify or attenuate the first high-pitched sound band signal to output the first high-pitched sound band correction signal. With respect to a frequency-based reference level, the second high sound correction circuit 142 may amplify or attenuate the second high-pitched sound band signal to output the second high-pitched sound band correction signal. With respect to a frequency-based reference level, the third high sound correction circuit 143 may amplify or attenuate the third high-pitched sound band signal to output the third high-pitched sound band correction signal. With respect to a frequency-based reference level, the fourth high sound correction circuit 144 may amplify or attenuate the fourth high-pitched sound band signal to output the fourth high-pitched sound band correction signal.

According to an example embodiment of the present disclosure, each of the first to the fourth high sound correction circuits 141, 142, 143, and 144 may be configured to amplify a corresponding high-pitched sound band signal up to 3 decibels (+3 dB). For example, each of the first to the fourth high sound correction circuits 141, 142, 143, and 144 may be a parametric equalizer, but embodiments of the present disclosure are not limited thereto.

According to another example embodiment of the present disclosure, when the driving apparatus 200 illustrated in FIG. 11 supplies a driving signal to the second active vibration member 40 illustrated in FIG. 8, and a high sound pressure level characteristic and a high sound characteristic of the low-pitched sound band are needed, the third high sound correction circuit 143 may completely attenuate a third high-pitched sound band signal with respect to a lowest level lower than a frequency-based reference level and may not output a third high-pitched sound band correction signal. Likewise, the fourth high sound correction circuit 144 may completely attenuate a fourth high-pitched sound band signal with respect to the lowest level lower than the frequency-based reference level and may not output a fourth high-pitched sound band correction signal, but embodiments of the present disclosure are not limited thereto.

According to another example embodiment of the present disclosure, when the driving apparatus 200 illustrated in FIG. 11 supplies a driving signal to the second active vibration member 40 illustrated in FIG. 9, and a high sound pressure level characteristic and a high sound characteristic of the low-pitched sound band are needed, the third high sound correction circuit 143 may completely attenuate a third high-pitched sound band signal with respect to a lowest level lower than a frequency-based reference level and may not output a third high-pitched sound band correction signal. Likewise, the fourth high sound correction circuit 144 may completely attenuate a fourth high-pitched sound band signal with respect to a lowest level lower than a frequency-based reference level and may not output a fourth high-pitched sound band correction signal, but embodiments of the present disclosure are not limited thereto.

With respect to a frequency-based reference level, the first low sound correction circuit 145 may amplify or attenuate the first low-pitched sound band signal to output the first low-pitched sound band correction signal. With respect to a frequency-based reference level, the second low sound correction circuit 146 may amplify or attenuate the second low-pitched sound band signal to output the second low-pitched sound band correction signal. With respect to a frequency-based reference level, the third low sound correction circuit 147 may amplify or attenuate the third low-pitched sound band signal to output the third low-pitched sound band correction signal. With respect to a frequency-based reference level, the fourth low sound correction circuit 148 may amplify or attenuate the fourth low-pitched sound band signal to output the fourth low-pitched sound band correction signal. For example, each of the first to the fourth low sound correction circuits 145, 146, 147, and 148 may be a parametric equalizer, but embodiments of the present disclosure are not limited thereto.

A driving apparatus 200 according to the second example embodiment of the present disclosure may further include a level adjustment circuit 120 for reducing, preventing, or minimizing an overshoot of signal amplification by the correction circuit 140 or for anti-phase driving between a first active vibration member 20 and a second active vibration member 40.

The level adjustment circuit 120 may attenuate a level of each of a high-pitched sound band signal and a low-pitched sound band signal supplied from the signal separation circuit 110 based on a gain value and may output the level-attenuated signal to the filter circuit 130. In addition, the level adjustment circuit 120 may adjust one or more of a phase and an amplitude of each of the high-pitched sound band signal and the low-pitched sound band signal supplied from the signal separation circuit 110 based on a gain value, and may output the adjusted signal to the filter circuit 130.

The level adjustment circuit 120 may include first and second high sound level adjustment circuits 121 and 122, and first and second low sound level adjustment circuits 125 and 126.

The first high sound level adjustment circuit 121 may attenuate a level of the high-pitched sound band signal supplied from the signal separation circuit 110 based on a gain value and may output the level-attenuated signal to each of first and second high sound filters 131 and 132 of the filter circuit 130. The first high sound level adjustment circuit 121 may adjust one or more of a phase and an amplitude of the high-pitched sound band signal supplied from the signal separation circuit 110 based on a gain value, and may output the adjusted signal to each of the first and second high sound filters 131 and 132 of the filter circuit 130.

The second high sound level adjustment circuit 122 may attenuate a level of the high-pitched sound band signal supplied from the signal separation circuit 110 based on a gain value, and may output the level-attenuated signal to each of third and fourth high sound filters 133 and 134 of the filter circuit 130. The second high sound level adjustment circuit 122 may adjust one or more of a phase and an amplitude of the high-pitched sound band signal supplied from the signal separation circuit 110 based on a gain value, and may output the adjusted signal to each of the third and fourth high sound filters 133 and 134 of the filter circuit 130.

The first low sound level adjustment circuit 125 may attenuate a level of the low-pitched sound band signal supplied from the signal separation circuit 110 based on a gain value and may output the level-attenuated signal to each of first and second low sound filters 135 and 136 of the filter circuit 130. The first low sound level adjustment circuit 125 may adjust one or more of a phase and an amplitude of the low-pitched sound band signal supplied from the signal separation circuit 110 based on a gain value, and may output the adjusted signal to each of the first and second low sound filters 135 and 136 of the filter circuit 130.

The second low sound level adjustment circuit 126 may attenuate a level of the low-pitched sound band signal supplied from the signal separation circuit 110 based on a gain value and may output the level-attenuated signal to each of third and fourth low sound filters 137 and 138 of the filter circuit 130. The second low sound level adjustment circuit 126 may adjust one or more of a phase and an amplitude of the low-pitched sound band signal supplied from the signal separation circuit 110 based on a gain value, and may output the adjusted signal to each of the third and fourth low sound filters 137 and 138 of the filter circuit 130.

According to an example embodiment of the present disclosure, when the driving apparatus 200 illustrated in FIG. 11 supplies the driving signal to the second active vibration member 40 illustrated in FIG. 8, and a high sound pressure level characteristic and a high sound characteristic of the low-pitched sound band are needed, the second high sound level adjustment circuit 122 may invert a phase of a high-pitched sound band signal supplied from the signal separation circuit 110 based on a gain value of −2 and may output the phase-inverted high-pitched sound band signal to each of the third and the fourth high sound filters 133 and 134. Thus, the second active vibration member 40 may be displaced (or vibrated or driven) in the same direction as that of the first active vibration member 20, thereby increasing a high sound pressure level characteristic and/or a sound characteristic of the low-pitched sound band.

According to another example embodiment of the present disclosure, when the driving apparatus 200 illustrated in FIG. 10 11 supplies the driving signal to the second active vibration member 40 illustrated in FIG. 9, and a high sound pressure level characteristic and a high sound characteristic of the low-pitched sound band are needed, the second high sound level adjustment circuit 122 may invert a phase of a high-pitched sound band signal supplied from the signal separation circuit 110 based on a gain value of −2 and may output the phase-inverted high-pitched sound band signal to each of the third and the fourth high sound filters 133 and 134. Thus, a first vibration portion 20A of the second active vibration member 40 may be displaced (or vibrated or driven) in the same direction as that of the first active vibration member 20, thereby increasing a high sound pressure level characteristic and/or a sound characteristic of the low-pitched sound band. Additionally, the second low sound level adjustment circuit 126 may invert a phase of a low-pitched sound band signal supplied from the signal separation circuit 110 based on a gain value of −2 and may output the phase-inverted low-pitched sound band signal to each of the third and the fourth low sound filters 137 and 138. Thus, a second vibration portion 20B of the second active vibration member 40 may be displaced (or vibrated or driven) in the same direction as that of the first active vibration member 20, thereby increasing a high sound pressure level characteristic and/or a sound characteristic of the low-pitched sound band.

The mixing circuit 150 may mix and output the first high-pitched sound band correction signal supplied from the first high sound correction circuit 141 and the first low-pitched sound band correction signal supplied from the first low sound correction circuit 145. The mixing circuit 150 may mix and output the second high-pitched sound band correction signal supplied from the second high sound correction circuit 142 and the second low-pitched sound band correction signal supplied from the second low sound correction circuit 146. In addition, the mixing circuit 150 may mix and output the third high-pitched sound band correction signal supplied from the third high sound correction circuit 143 and the third low-pitched sound band correction signal supplied from the third low sound correction circuit 147. The mixing circuit 150 may mix and output the fourth high-pitched sound band correction signal supplied from the fourth high sound correction circuit 144 and the fourth low-pitched sound band correction signal supplied from the fourth low sound correction circuit 148.

The mixing circuit 150 according to an example embodiment of the present disclosure may include first to fourth mixing circuits 151, 152, 155, and 156.

The first mixing circuit 151 may mix the first high-pitched sound band correction signal supplied from the first high sound correction circuit 141 of the correction circuit 140 and the first low-pitched sound band correction signal supplied from the first low sound correction circuit 145 to generate a first mixing signal and may supply the generated first mixing signal to the driving signal generator 160.

The second mixing circuit 152 may mix the second high-pitched sound band correction signal supplied from the second high sound correction circuit 142 of the correction circuit 140 and the second low-pitched sound band correction signal supplied from the second low sound correction circuit 146 to generate a second mixing signal and may supply the generated second mixing signal to the driving signal generator 160.

The third mixing circuit 155 may mix the third high-pitched sound band correction signal supplied from the third high sound correction circuit 143 of the correction circuit 140 and the third low-pitched sound band correction signal supplied from the third low sound correction circuit 147 to generate a third mixing signal and may supply the generated third mixing signal to the driving signal generator 160.

The fourth mixing circuit 156 may mix the fourth high-pitched sound band correction signal supplied from the fourth high sound correction circuit 144 of the correction circuit 140 and the fourth low-pitched sound band correction signal supplied from the fourth low sound correction circuit 148 to generate a fourth mixing signal and may supply the generated fourth mixing signal to the driving signal generator 160.

The driving signal generator 160 may output a first driving signal based on the first mixing signal supplied from the mixing circuit 150 and may output a second driving signal based on the second mixing signal supplied from the mixing circuit 150. The driving signal generator 160 may output a third driving signal based on the third mixing signal supplied from the mixing circuit 150 and may output a fourth driving signal based on the fourth mixing signal supplied from the mixing circuit 150.

The driving signal generator 160 according to an example embodiment of the present disclosure may include first and second digital-to-analog converters 161 and 162, and first and second amplifiers 165 and 166.

The first digital-to-analog converter 161 may respectively convert the first mixing signal and the second mixing signal supplied from the mixing circuit 150 into first and second analog signals and may output the first and second analog signals.

The second digital-to-analog converter 162 may respectively convert the third mixing signal and the fourth mixing signal supplied from the mixing circuit 150 into third and fourth analog signals and may output the third and fourth analog signals.

The first amplifier 165 may respectively amplify the first and second analog signals supplied from the first digital-to-analog converter 161 to the first and second driving signals. The first and second driving signals may be respectively supplied to the first vibration portion 20A and the second vibration portion 20B through a pad part at the first active vibration member 20 through a signal cable 27.

The second amplifier 166 may respectively amplify the third and fourth analog signals supplied from the second digital-to-analog converter 162 to the third and fourth driving signals. The third and fourth driving signals may be respectively supplied to the first vibration portion 20A and the second vibration portion 20B through a pad part at the second active vibration member 40 through a signal cable 27.

The driving apparatus 200 according to the second example embodiment of the present disclosure may supply a time-delayed low-pitched sound band driving signal to each of the first vibration portion 20A and the second vibration portion 20B tiled to each of the first and second active vibration members 20 and 40. Thus, the driving apparatus 200 may vibrate each of the first and second active vibration members 20 and 40 in a mode shape or may correct a mode shape of each of the first and second active vibration members 20 and 40 to enhance a sound pressure level characteristic of each of the first and second active vibration members 20 and 40, thereby enhancing a sound pressure level characteristic and/or a sound characteristic of the low-pitched sound band and extending the low-pitched sound band, but embodiments of the present disclosure are not limited thereto.

Figure 12:
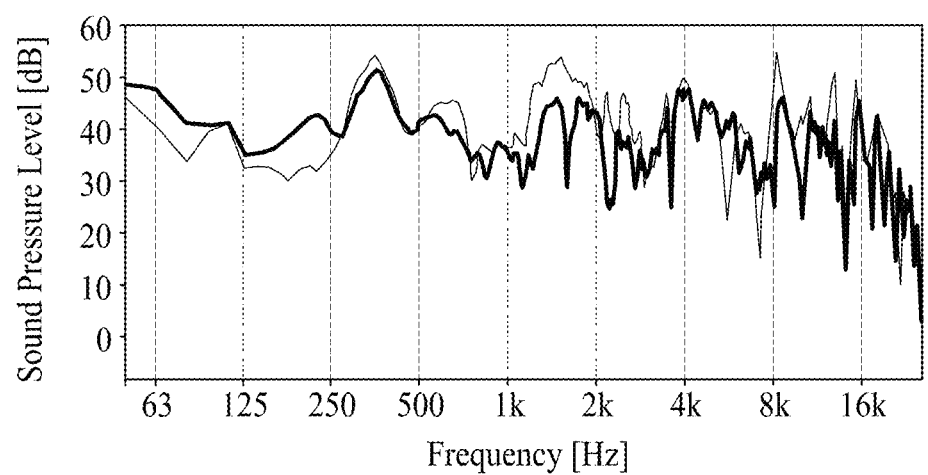
FIG. 12 illustrates a sound output characteristic of an apparatus according to an example embodiment of the present disclosure and a sound output characteristic of an apparatus according to an experiment example.

FIG. 12 illustrates a sound output characteristic of an apparatus according to an example embodiment of the present disclosure and a sound output characteristic of an apparatus according to an experiment example. In FIG. 12, the abscissa axis represents a frequency (Hz), and the ordinate axis represents a sound pressure level SPL (dB). In FIG. 12, a thick solid line represents a sound output characteristic of a case where an apparatus is configured by delaying a driving signal applied to each of first and second vibration portions (e.g., 20A and 20B) of an active vibration member (e.g., 20), and a thin solid line represents a sound output characteristic of a case where an apparatus is configured without delaying a driving signal applied to each of first and second vibration portions of an active vibration member.

As may be seen in FIG. 12, a sound pressure level increases in a low-pitched sound band of 250 Hz or less and the flatness of a full frequency range is improved in the thick solid line compared to the thin solid line. Thus, a peak is reduced in the thick solid line compared to the thin solid line.

Accordingly, the apparatus according to an example embodiment of the present disclosure may delay the driving signal applied to each of the first and second vibration portions of the active vibration member. Thus, a sound pressure level characteristic and/or a sound characteristic of the low-pitched sound band may be enhanced, and the flatness may be enhanced.

An apparatus according to various example embodiments of the present disclosure may be described as follows.

An apparatus according to an embodiment of the present disclosure may comprise: a passive vibration member; an active vibration member connected to the passive vibration member and including first and second vibration portions arranged in parallel with each other; and a driving apparatus configured to apply a first driving signal to the first vibration portion and a second driving signal to the second vibration portion, based on an input signal, to vibrate the first vibration portion and the second vibration portion. The driving apparatus may comprise: a signal separation circuit configured to separate the input signal into a low-pitched sound band signal and a high-pitched sound band signal; a filter circuit configured to output first and second high-pitched sound band signals based on the high-pitched sound band signal and to output first and second low-pitched sound band signals based on the low-pitched sound band signal; a correction circuit configured to correct a sound quality of each of the first and the second high-pitched sound band signals and the first and the second low-pitched sound band signals to output a first high-pitched sound band correction signal, a second high-pitched sound band correction signal, a first low-pitched sound band correction signal, and a second low-pitched sound band correction signal; a mixing circuit configured to mix the first high-pitched sound band correction signal with the first low-pitched sound band correction signal to generate a first mixing signal and is configured to mix the second high-pitched sound band correction signal with the second low-pitched sound band correction signal to generate a second mixing signal; and a driving signal generator configured to output the first driving signal based on the first mixing signal and configured to output the second driving signal based on the second mixing signal.

According to some embodiments of the present disclosure, the filter circuit may be further configured to: delay the low-pitched sound band signal to output the first low-pitched sound band signal; and delay the low-pitched sound band signal to output the second low-pitched sound band signal.

According to some embodiments of the present disclosure, the filter circuit may be further configured to: delay the low-pitched sound band signal for a first low sound delay time to output the first low-pitched sound band signal; and delay the low-pitched sound band signal for a second low sound delay time different from the first low sound delay time to output the second low-pitched sound band signal.

According to some embodiments of the present disclosure, each of the first low sound delay time and the second low sound delay time may be 30 ms or less with respect to the input signal.

According to some embodiments of the present disclosure, the filter circuit may be further configured to delay the high-pitched sound band signal to output the first high-pitched sound band signal and to delay the high-pitched sound band signal to output the second high-pitched sound band signal; and a delay time of the first high-pitched sound band signal may be equal to or different from a delay time of the second high-pitched sound band signal with respect to the input signal.

According to some embodiments of the present disclosure, the delay time of each of the first high-pitched sound band signal and the second high-pitched sound band signal may be in a range from 0 ms to 10 ms, with respect to the input signal.

According to some embodiments of the present disclosure, the correction circuit may be further configured to amplify each of the first high-pitched sound band signal and the second high-pitched sound band signal up to a maximum of 3 decibels (+3 dB).

According to some embodiments of the present disclosure, the driving apparatus may further comprise a level adjustment circuit configured to attenuate a level of the high-pitched sound band signal and the low-pitched sound band signal based on a gain value and to supply a level-attenuated high-pitched sound band signal and a level-attenuated low-pitched sound band signal to the filter circuit.

According to some embodiments of the present disclosure, the apparatus may further comprise a second active vibration member including third and fourth vibration portions arranged in parallel to each other. The first active vibration member may be connected to a first surface of the passive vibration member, and the second active vibration member may be connected to a second surface of the passive vibration member opposite the first surface to overlap at least a portion of the first active vibration member. The filter circuit may be further configured to output third and fourth high-pitched sound band signals based on the high-pitched sound band signal and to output third and fourth low-pitched sound band signals based on the low-pitched sound band signal. The correction circuit may be further configured to correct a sound quality of each of the third and the fourth high-pitched sound band signals and the third and the fourth low-pitched sound band signals to output third and fourth high-pitched sound band correction signals and third and fourth low-pitched sound band correction signals. The mixing circuit may be further configured to mix the third high-pitched sound band correction signal with the third low-pitched sound band correction signal to generate a third mixing signal and is further configured to mix the fourth high-pitched sound band correction signal with the fourth low-pitched sound band correction signal to generate a fourth mixing signal. The driving signal generator may be further configured to output the third driving signal to the third vibration portion based on the third mixing signal and to output the fourth driving signal to the fourth vibration portion based on the fourth mixing signal.

According to some embodiments of the present disclosure, the filter circuit may be further configured to: delay the low-pitched sound band signal to output the first low-pitched sound band signal; delay the low-pitched sound band signal to output the second low-pitched sound band signal; delay the low-pitched sound band signal to output the third low-pitched sound band signal; and delay the low-pitched sound band signal to output the fourth low-pitched sound band signal.

According to some embodiments of the present disclosure, the filter circuit may be further configured to: delay the low-pitched sound band signal for a first low sound delay time to output the first low-pitched sound band signal; delay the low-pitched sound band signal for a second low sound delay time different from the first low sound delay time to output the second low-pitched sound band signal; delay the low-pitched sound band signal for a third low sound delay time to output the third low-pitched sound band signal; and delay the low-pitched sound band signal for a fourth low sound delay time different from the third low sound delay time to output the fourth low-pitched sound band signal.

According to some embodiments of the present disclosure, each of the first low sound delay time and the second low sound delay time may be 30 ms or less with respect to the input signal, or each of the third low sound delay time and the fourth low sound delay time may be 30 ms or less with respect to the input signal.

According to some embodiments of the present disclosure, the first low sound delay time may be equal to or different from the third low sound delay time, and the second low sound delay time may be equal to or different from the fourth low sound delay time.

According to some embodiments of the present disclosure, the correction circuit may be further configured to completely attenuate each of the third high-pitched sound band signal and the fourth high-pitched sound band signal.

According to some embodiments of the present disclosure, filter circuit may comprise: a first high sound filter configured to output the first high-pitched sound band signal based on the high-pitched sound band signal; a second high sound filter configured to output the second high-pitched sound band signal based on the high-pitched sound band signal; a third high sound filter configured to output the third high-pitched sound band signal based on the high-pitched sound band signal; a fourth high sound filter configured to output the fourth high-pitched sound band signal based on the high-pitched sound band signal; a first low sound filter configured to output the first low-pitched sound band signal based on the low-pitched sound band signal; a second low sound filter configured to output the second low-pitched sound band signal based on the low-pitched sound band signal; a third low sound filter configured to output the third low-pitched sound band signal based on the low-pitched sound band signal; and a fourth low sound filter configured to output the fourth low-pitched sound band signal based on the low-pitched sound band signal.

According to some embodiments of the present disclosure, the driving apparatus further comprises a level adjustment circuit, where the level adjustment circuit may comprise: a first high sound level adjustment circuit configured to attenuate a level of the high-pitched sound band signal based on a first gain value and to supply a first level-adjusted high-pitched sound band signal to the first and the second high sound filters; a second high sound level adjustment circuit configured to attenuate the level of the high-pitched sound band signal based on a second gain value and to supply a second level-adjusted high-pitched sound band signal to the third and fourth high sound filters; a first low sound level adjustment circuit configured to attenuate a level of the low-pitched sound band signal based on a third gain value and to supply a first level-adjusted low-pitched sound band signal to the first and second low sound filters; and a second low sound level adjustment circuit configured to attenuate the level of the low-pitched sound band signal based on a fourth gain value and to supply a second level-adjusted low-pitched sound band signal to the third and fourth low sound filters.

According to some embodiments of the present disclosure, the second high sound level adjustment circuit may be further configured to invert a phase of the high-pitched sound band signal based on the second gain value and to supply a phase-inverted high-pitched sound band signal to the third and the fourth high sound filters.

According to some embodiments of the present disclosure, each of the first vibration portion and the second vibration portion may comprise: a vibration layer including a plurality of inorganic material portions and a plurality of organic material portions between the plurality of inorganic material portions; a first electrode layer at a first surface of the vibration layer; and a second electrode layer at a second surface of the vibration layer different from the first surface.

According to some embodiments of the present disclosure, the passive vibration member may comprise one or more of metal, plastic, wood, paper, fiber, cloth, leather, glass, carbon, and a mirror.

According to some embodiments of the present disclosure, the passive vibration member may comprise one or more of a display panel including a pixel configured to display an image, a screen panel on which an image is to be projected from a display apparatus, a light-emitting diode lighting panel, an organic light-emitting lighting panel, an inorganic light-emitting lighting panel, a signage panel, a vehicular interior material, a vehicular exterior material, a vehicular glass window, a vehicular seat interior material, a building ceiling material, a building interior material, a building glass window, an aircraft interior material, an aircraft glass window, and a mirror.

A vibration apparatus according to an embodiment of the present disclosure may be applied to a vibration apparatus disposed in an apparatus. The apparatus according to an embodiment of the present disclosure may be applied to mobile apparatuses, video phones, smart watches, watch phones, wearable apparatuses, foldable apparatuses, rollable apparatuses, bendable apparatuses, flexible apparatuses, curved apparatuses, sliding apparatuses, variable apparatuses, electronic organizers, electronic book, portable multimedia players (PMPs), personal digital assistants (PDAs), MP3 players, mobile medical devices, desktop personal computers (PCs), laptop PCs, netbook computers, workstations, navigation apparatuses, automotive navigation apparatuses, automotive display apparatuses, automotive apparatuses, theater apparatuses, theater display apparatuses, TVs, wall paper display apparatuses, signage apparatuses, game apparatuses, notebook computers, monitors, cameras, camcorders, home appliances, among other things. Additionally, an apparatus (or a vibration apparatus) according to some embodiments of the present disclosure may be applied to organic light-emitting lighting apparatuses or inorganic light-emitting lighting apparatuses. When the apparatus (or the vibration apparatus) is applied to lighting apparatuses, the lighting apparatuses may function as lighting and a speaker. In addition, when the apparatus (or the vibration apparatus) of some embodiments of the present disclosure is applied to a mobile device or the like, the apparatus (or the vibration apparatus) may function as one or more of a speaker, a receiver, and a haptic device, but embodiments of the present disclosure are not limited thereto.

It will be apparent to those skilled in the art that various modifications and variations can be made in the present disclosure without departing from the technical idea or scope of the disclosures. Thus, it is intended that embodiments of the present disclosure cover the modifications and variations of the disclosure provided they come within the scope of the appended claims and their equivalents.

What is claimed is:

1. An apparatus, comprising:
a passive vibration member;
an active vibration member connected to the passive vibration member and including first and second vibration portions arranged in parallel with each other; and
a driving apparatus configured to apply a first driving signal to the first vibration portion and a second driving signal to the second vibration portion, based on an input signal, to vibrate the first vibration portion and the second vibration portion,
wherein the driving apparatus comprises:
a signal separation circuit configured to separate the input signal into a low-pitched sound band signal and a high-pitched sound band signal;
a filter circuit configured to output first and second high-pitched sound band signals based on the high-pitched sound band signal and to output first and second low-pitched sound band signals based on the low-pitched sound band signal;
a correction circuit configured to correct a sound quality of each of the first and the second high-pitched sound band signals and the first and the second low-pitched sound band signals to output a first high-pitched sound band correction signal, a second high-pitched sound band correction signal, a first low-pitched sound band correction signal, and a second low-pitched sound band correction signal;
a mixing circuit configured to mix the first high-pitched sound band correction signal with the first low-pitched sound band correction signal to generate a first mixing signal and is configured to mix the second high-pitched sound band correction signal with the second low-pitched sound band correction signal to generate a second mixing signal; and
a driving signal generator configured to output the first driving signal based on the first mixing signal and configured to output the second driving signal based on the second mixing signal.

2. The apparatus of claim 1, wherein the filter circuit is further configured to:
delay the low-pitched sound band signal to output the first low-pitched sound band signal; and
delay the low-pitched sound band signal to output the second low-pitched sound band signal.

3. The apparatus of claim 1, wherein the filter circuit is further configured to:
delay the low-pitched sound band signal for a first low sound delay time to output the first low-pitched sound band signal; and
delay the low-pitched sound band signal for a second low sound delay time different from the first low sound delay time to output the second low-pitched sound band signal.

4. The apparatus of claim 3, wherein each of the first low sound delay time and the second low sound delay time is 30 ms or less with respect to the input signal.

5. The apparatus of claim 1, wherein:
the filter circuit is further configured to delay the high-pitched sound band signal to output the first high-pitched sound band signal and to delay the high-pitched sound band signal to output the second high-pitched sound band signal; and
a delay time of the first high-pitched sound band signal is equal to or different from a delay time of the second high-pitched sound band signal with respect to the input signal.

6. The apparatus of claim 5, wherein the delay time of each of the first high-pitched sound band signal and the second high-pitched sound band signal is in a range from 0 ms to 10 ms, with respect to the input signal.

7. The apparatus of claim 1, wherein the correction circuit is further configured to amplify each of the first high-pitched sound band signal and the second high-pitched sound band signal up to a maximum of 3 decibels.

8. The apparatus of claim 1, wherein the driving apparatus further comprises a level adjustment circuit configured to attenuate a level of the high-pitched sound band signal and the low-pitched sound band signal based on a gain value and to supply a level-attenuated high-pitched sound band signal and a level-attenuated low-pitched sound band signal to the filter circuit.

9. The apparatus of claim 1, further comprising:
a second active vibration member including third and fourth vibration portions arranged in parallel to each other,
wherein:
the first active vibration member is connected to a first surface of the passive vibration member, and the second active vibration member is connected to a second surface of the passive vibration member opposite the first surface to overlap at least a portion of the first active vibration member;
the filter circuit is further configured to output third and fourth high-pitched sound band signals based on the high-pitched sound band signal and to output third and fourth low-pitched sound band signals based on the low-pitched sound band signal;
the correction circuit is further configured to correct a sound quality of each of the third and the fourth high-pitched sound band signals and the third and the fourth low-pitched sound band signals to output third and fourth high-pitched sound band correction signals and third and fourth low-pitched sound band correction signals;
the mixing circuit is further configured to mix the third high-pitched sound band correction signal with the third low-pitched sound band correction signal to generate a third mixing signal and is further configured to mix the fourth high-pitched sound band correction signal with the fourth low-pitched sound band correction signal to generate a fourth mixing signal; and
the driving signal generator is further configured to output the third driving signal to the third vibration portion based on the third mixing signal and to output the fourth driving signal to the fourth vibration portion based on the fourth mixing signal.

10. The apparatus of claim 9, wherein the filter circuit is further configured to:
delay the low-pitched sound band signal to output the first low-pitched sound band signal;
delay the low-pitched sound band signal to output the second low-pitched sound band signal;
delay the low-pitched sound band signal to output the third low-pitched sound band signal; and
delay the low-pitched sound band signal to output the fourth low-pitched sound band signal.

11. The apparatus of claim 9, wherein the filter circuit is further configured to:
delay the low-pitched sound band signal for a first low sound delay time to output the first low-pitched sound band signal;
delay the low-pitched sound band signal for a second low sound delay time different from the first low sound delay time to output the second low-pitched sound band signal;
delay the low-pitched sound band signal for a third low sound delay time to output the third low-pitched sound band signal; and
delay the low-pitched sound band signal for a fourth low sound delay time different from the third low sound delay time to output the fourth low-pitched sound band signal.

12. The apparatus of claim 11, wherein:
each of the first low sound delay time and the second low sound delay time is 30 ms or less with respect to the input signal; or
each of the third low sound delay time and the fourth low sound delay time is 30 ms or less with respect to the input signal.

13. The apparatus of claim 11, wherein:
the first low sound delay time is equal to or different from the third low sound delay time; and
the second low sound delay time is equal to or different from the fourth low sound delay time.

14. The apparatus of claim 9, wherein the correction circuit is further configured to completely attenuate each of the third high-pitched sound band signal and the fourth high-pitched sound band signal.

15. The apparatus of claim 9, wherein the filter circuit comprises:
a first high sound filter configured to output the first high-pitched sound band signal based on the high-pitched sound band signal;
a second high sound filter configured to output the second high-pitched sound band signal based on the high-pitched sound band signal;
a third high sound filter configured to output the third high-pitched sound band signal based on the high-pitched sound band signal;
a fourth high sound filter configured to output the fourth high-pitched sound band signal based on the high-pitched sound band signal;
a first low sound filter configured to output the first low-pitched sound band signal based on the low-pitched sound band signal;
a second low sound filter configured to output the second low-pitched sound band signal based on the low-pitched sound band signal;
a third low sound filter configured to output the third low-pitched sound band signal based on the low-pitched sound band signal; and
a fourth low sound filter configured to output the fourth low-pitched sound band signal based on the low-pitched sound band signal.

16. The apparatus of claim 15, wherein the driving apparatus further comprises a level adjustment circuit, the level adjustment circuit comprising:
a first high sound level adjustment circuit configured to attenuate a level of the high-pitched sound band signal based on a first gain value and to supply a first level-adjusted high-pitched sound band signal to the first and the second high sound filters;

a second high sound level adjustment circuit configured to attenuate the level of the high-pitched sound band signal based on a second gain value and to supply a second level-adjusted high-pitched sound band signal to the third and fourth high sound filters;

a first low sound level adjustment circuit configured to attenuate a level of the low-pitched sound band signal based on a third gain value and to supply a first level-adjusted low-pitched sound band signal to the first and second low sound filters; and a second low sound level adjustment circuit configured to attenuate the level of the low-pitched sound band signal based on a fourth gain value and to supply a second level-adjusted low-pitched sound band signal to the third and fourth low sound filters.

17. The apparatus of claim 16, wherein the second high sound level adjustment circuit is further configured to invert a phase of the high-pitched sound band signal based on the second gain value and to supply a phase-inverted high-pitched sound band signal to the third and the fourth high sound filters.

18. The apparatus of claim 1, wherein each of the first vibration portion and the second vibration portion comprises:
a vibration layer including a plurality of inorganic material portions and a plurality of organic material portions between the plurality of inorganic material portions;
a first electrode layer at a first surface of the vibration layer; and
a second electrode layer at a second surface of the vibration layer different from the first surface.

19. The apparatus of claim 1, wherein the passive vibration member comprises one or more of metal, plastic, wood, paper, fiber, cloth, leather, glass, carbon, and a mirror.

20. The apparatus of claim 1, wherein the passive vibration member comprises one or more of a display panel including a pixel configured to display an image, a screen panel on which an image is to be projected from a display apparatus, a light-emitting diode lighting panel, an organic light-emitting lighting panel, an inorganic light-emitting lighting panel, a signage panel, a vehicular interior material, a vehicular exterior material, a vehicular glass window, a vehicular seat interior material, a building ceiling material, a building interior material, a building glass window, an aircraft interior material, an aircraft glass window, and a mirror.

* * * * *